(12) United States Patent
Shah et al.

(10) Patent No.: US 11,627,129 B2
(45) Date of Patent: Apr. 11, 2023

(54) METHOD AND SYSTEM FOR CONTEXTUAL ACCESS CONTROL

(71) Applicant: Citrix Systems, Inc., Fort Lauderdale, FL (US)

(72) Inventors: Harsh Shah, Pompano Beach, FL (US); Manbinder Pal Singh, Coral Springs, FL (US); Rachelle Tobkes, Davie, FL (US); Jacob Summers, Coral Springs, FL (US)

(73) Assignee: Citrix Systems, Inc., Fort Lauderdale, FL (US)

(*) Notice: Subject to any disclaimer, the term of this patent is extended or adjusted under 35 U.S.C. 154(b) by 164 days.

(21) Appl. No.: 17/070,602

(22) Filed: Oct. 14, 2020

(65) Prior Publication Data

US 2022/0116392 A1 Apr. 14, 2022

(51) Int. Cl.
*H04L 29/00* (2006.01)
*H04L 9/40* (2022.01)

(52) U.S. Cl.
CPC ........ *H04L 63/0876* (2013.01); *H04L 63/102* (2013.01); *H04L 63/1433* (2013.01); *H04L 63/20* (2013.01); *H04L 2463/082* (2013.01)

(58) Field of Classification Search
CPC .............. H04L 63/0876; H04L 63/102; H04L 63/1433; H04L 63/20; H04L 2463/082; H04L 63/0838
See application file for complete search history.

(56) References Cited

U.S. PATENT DOCUMENTS

| | | | | |
|---|---|---|---|---|
| 9,819,684 B2* | 11/2017 | Cernoch | ............... | H04L 63/105 |
| 10,305,891 B2* | 5/2019 | Votaw | ................ | G06F 21/32 |
| 10,375,119 B2* | 8/2019 | Aronowitz | ............ | H04L 63/205 |
| 11,159,505 B1* | 10/2021 | Lester | ................... | G06F 21/552 |
| 11,303,661 B2* | 4/2022 | Galula | ................. | H04L 63/123 |
| 11,438,342 B2* | 9/2022 | McDorman | .............. | H04L 41/22 |
| 2008/0162338 A1* | 7/2008 | Samuels | ............... | G06Q 20/40 705/42 |
| 2014/0289822 A1* | 9/2014 | Wilson | .................. | H04L 9/0819 726/5 |
| 2015/0012988 A1* | 1/2015 | Jeng | .................... | H04L 63/0838 726/7 |
| 2016/0261586 A1* | 9/2016 | Huang | .................. | H04L 63/083 |
| 2018/0310175 A1* | 10/2018 | Kim | ....................... | H04W 60/00 |
| 2019/0190920 A1* | 6/2019 | Connell, II | ........... | H04W 12/71 |
| 2019/0392450 A1* | 12/2019 | Gosset | ................... | G06Q 20/12 |
| 2020/0204373 A1* | 6/2020 | Lu | ......................... | H04L 9/0869 |

(Continued)

*Primary Examiner* — Don G Zhao

(57) ABSTRACT

Described embodiments provide systems and methods for contextual confidence scoring-based access control. The systems and methods can include one or more processors configured to receive a request from the client device to access an item of content. The one or more processors can select a first subset of authentication techniques. The authentication techniques identifiable with a score. The one or more processors can determine that a sum of the scores of the selected first subset of the authentication techniques exceeds a threshold. The one or more processors can transmit, to the client device, one or more authentication requests utilizing the selected first subset of authentication techniques. The one or more processors can provide, responsive to successful authentication by the client device, access to the item of content to the client device.

14 Claims, 10 Drawing Sheets

(56) References Cited

U.S. PATENT DOCUMENTS

| | | | |
|---|---|---|---|
| 2020/0220876 A1* | 7/2020 | Suzuki | G06Q 20/321 |
| 2020/0293638 A1* | 9/2020 | Rose | H04L 63/1425 |
| 2020/0322321 A1* | 10/2020 | Lynn | H04L 63/08 |
| 2020/0322330 A1* | 10/2020 | Lynn | H04L 63/20 |
| 2021/0004451 A1* | 1/2021 | Novik | H04W 12/06 |
| 2021/0081654 A1* | 3/2021 | Kochi | G06K 9/6215 |
| 2021/0168148 A1* | 6/2021 | Boodaei | H04L 63/0861 |

* cited by examiner

| Authentication Techniques | Context Scores |
|---|---|
| Pattern | 30 |
| Passcode | 40 |
| Password | 50 |
| Anti-Bot Validation | 10 |
| Verification Code (Multi-Factor) | 25 |
| Fingerprint | 75 |
| Face ID | 85 |
| Location - Home | 20 |
| Location - Office | 10 |
| Network Connection - Home | 50 |
| Network Connection - Office | 25 |

FIG. 3

METHOD AND SYSTEM FOR CONTEXTUAL ACCESS CONTROL

FIELD OF THE DISCLOSURE

The present application generally relates to security management, including but not limited to systems and methods for contextually authenticating a device.

BACKGROUND

Client devices, and applications on the client device, can support one or more methods of authentication. Client devices can be asked for authentication to prove the identities of authenticators of the client devices. Authenticators can provide authentication credentials, such as username and password. Other methods of authentications can include voice recognition, card scan, fingerprint, and retina scan.

SUMMARY

This Summary is provided to introduce a selection of concepts in a simplified form that are further described below in the Detailed Description. This Summary is not intended to identify key features or essential features, nor is it intended to limit the scope of the claims included herewith.

The present disclosure is directed towards systems and methods for contextual confidence scoring-based access control. A contextual confidence score can generally be an indication of strength or risk level associated with a respective authentication technique based on the context of the client device. The context can include the location of the client device, which authentication technique is selected to verify the identity of the authenticator, and how the authentication technique was verified. One or more client devices can be verified and accessed via similar types of authentication techniques. The systems and methods can evaluate the confidence level (e.g., via the context score) of one or more authentication techniques by factoring in at least the context of a client, a client device, and a network connection during the authentication attempt. In some implementations, the systems and methods can compare a context score associated with a successful authentication to a criterion or a score threshold to provide access to an application or a device for the client. In some implementations, the systems and methods can remove a one-time password ("OTP") or an authentication technique from a list of available authentication techniques or mechanisms with the current context due to a low context score, and add the aforementioned back to the list in response to a change in context. In some implementations, the context score can be leveraged to i) strengthen the security level by enhancing an authentication technique; ii) identify any anomalies or abnormalities in the utilization of the authentication technique; and iii) reducing or removing trust from one or more authentication techniques based on the context score.

An aspect provides systems and methods for contextual confidence scoring-based access control. For example, the systems and methods can receive a request from the client device to access an item of content via a network interface. The network interface can in communication with the client device. The systems and methods can select a first subset of authentication techniques associated with access to the item of content by the client device in response to receiving the request. The authentication techniques can be associated with a context score (individually or collectively). The systems and methods can determine that a sum of the context scores associated with the selected first subset of the authentication techniques exceeds a score threshold. The systems and methods can transmit, responsive to the determination that the sum of the context scores exceeds the score threshold, one or more authentication requests utilizing the selected first subset of authentication techniques to the client device via the network interface. The systems and methods can provide access to the item of content to the client device in response to successful authentication by the client device.

In one aspect, this disclosure is directed to a method for contextual confidence scoring-based access control. The method can include receiving, by a computing device via a network interface in communication with a client device, a request from the client device to access an item of content. The method can include selecting, by the computing device, responsive to receiving the request, a first subset of authentication techniques associated with access to the item of content by the client device, each of the authentication techniques associated with a context score. The method can include determining, by the computing device, that a sum of the context scores associated with the selected first subset of the authentication techniques exceeds a score threshold. The method can include transmitting, by the computing device to the client device via the network interface, responsive to the determination that the sum of the context scores exceeds the score threshold, one or more authentication requests utilizing the selected first subset of authentication techniques. The method can include providing, by the computing device responsive to successful authentication by the client device, access to the item of content to the client device.

In some implementations, the method can include selecting a first authentication technique. The method can include determining that the context score associated with the first authentication technique is less than the score threshold. The method can include selecting a second authentication technique to include in the first subset, responsive to the determination that the context score associated with the first authentication technique is less than the score threshold.

In some implementations, the method can include receiving, from the client device, one or more responses to the one or more authentication requests comprising, for each of the authentication techniques, an indication of successful or unsuccessful authentication. The method can include comparing, by the computing device, a sum of the context scores of each of the authentication techniques having an indication of successful authentication in the one or more responses to the score threshold. The method can include identifying, by the computing device, that the client device has successfully authenticated, responsive to the sum of the context scores of each of the authentication techniques having the indication of successful authentication exceeding the score threshold. In some implementations, the indication of successful authentication can include a match between a received value and a stored value for the corresponding authentication technique. In some implementations, at least one response can include an indication of unsuccessful authentication, and the sum of each of the authentication techniques having an indication of successful authentication in the one or more responses is less than the sum of the context scores associated with the selected first subset of the plurality of authentication techniques.

In some implementations, the method can include receiving, from the client device, one or more responses to the one or more authentication requests comprising, for each of the authentication techniques, an indication of successful or unsuccessful authentication. The method can include comparing, by the computing device, a sum of the context scores of each of the authentication techniques having an indication of successful authentication in the one or more responses to the score threshold. The method can include identifying, by the computing device, that the client device has not successfully authenticated, responsive to the sum of the context scores of each of the authentication techniques having the indication of successful authentication being less than the score threshold. The method can include transmitting, by the computing device to the client device, an additional authentication request utilizing an additional authentication technique. In some implementations, the method can include selecting the additional authentication technique, by the computing device, responsive to a sum of the context scores of each of the plurality of authentication techniques having the indication of successful authentication and a context score associated with the additional authentication technique exceeding the score threshold.

In some implementations, the method can include increasing a context score associated with a first authentication technique responsive to an historical rate of successful authentication with the client device using the first authentication technique exceeding a threshold. In some implementations, the method can include decreasing a context score associated with a first authentication technique responsive to an historical rate of successful authentication with the client device using the first authentication technique being less than a threshold.

In another aspect, this disclosure is directed to a system for contextual confidence scoring-based access control. The system can include a computing device having a memory, and one or more processors operatively coupled to the memory. The computing device can receive, via a network interface in communication with a client device, a request from the client device to access an item of content. The computing device can select, responsive to receiving the request, a first subset of authentication techniques associated with access to the item of content by the client device, each of the authentication techniques associated with a context score. The computing device can determine that a sum of the context scores associated with the selected first subset of the authentication techniques exceeds a score threshold. The computing device can transmit to the client device via the network interface, responsive to the determination that the sum of the context scores exceeds the score threshold, one or more authentication requests utilizing the selected first subset of authentication techniques. The computing device can provide, responsive to successful authentication by the client device, access to the item of content to the client device.

In some implementations, the computing device can select a first authentication technique. The computing device can determine that the context score associated with the first authentication technique is less than the score threshold. The computing device can select a second authentication technique to include in the first subset, responsive to the determination that the context score associated with the first authentication technique is less than the score threshold.

In some implementations, the computing device can receive, from the client device, one or more responses to the one or more authentication requests comprising, for each of the authentication techniques, an indication of successful or unsuccessful authentication. The computing device can compare a sum of the context scores of each of the authentication techniques having an indication of successful authentication in the one or more responses to the score threshold. The computing device can identify that the client device has successfully authenticated, responsive to the sum of the context scores of each of the authentication techniques having the indication of successful authentication exceeding the score threshold. In some implementations, the indication of successful authentication can include a match between a received value and a stored value for the corresponding authentication technique. In some implementations, at least one response can include an indication of unsuccessful authentication, and the sum of each of the authentication techniques having an indication of successful authentication in the one or more responses is less than the sum of the context scores associated with the selected first subset of the plurality of authentication techniques.

In some implementations, the computing device can receive, from the client device, one or more responses to the one or more authentication requests comprising, for each of the authentication techniques, an indication of successful or unsuccessful authentication. The computing device can compare a sum of the context scores of each of the authentication techniques having an indication of successful authentication in the one or more responses to the score threshold. The computing device can identify that the client device has not successfully authenticated, responsive to the sum of the context scores of each of the authentication techniques having the indication of successful authentication being less than the score threshold. The computing device can transmit, to the client device, an additional authentication request utilizing an additional authentication technique. In some implementations, the computing device can select the additional authentication technique, by the computing device, responsive to a sum of the context scores of each of the plurality of authentication techniques having the indication of successful authentication and a context score associated with the additional authentication technique exceeding the score threshold.

In some implementations, the computing device can increase a context score associated with a first authentication technique responsive to an historical rate of successful authentication with the client device using the first authentication technique exceeding a threshold. In some implementations, the computing device can decrease a context score associated with a first authentication technique responsive to an historical rate of successful authentication with the client device using the first authentication technique being less than a threshold.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

FIG. 3 is an example illustration of a table with a list of authentication techniques and context scores, in accordance with an implementation;

Figure 8A:
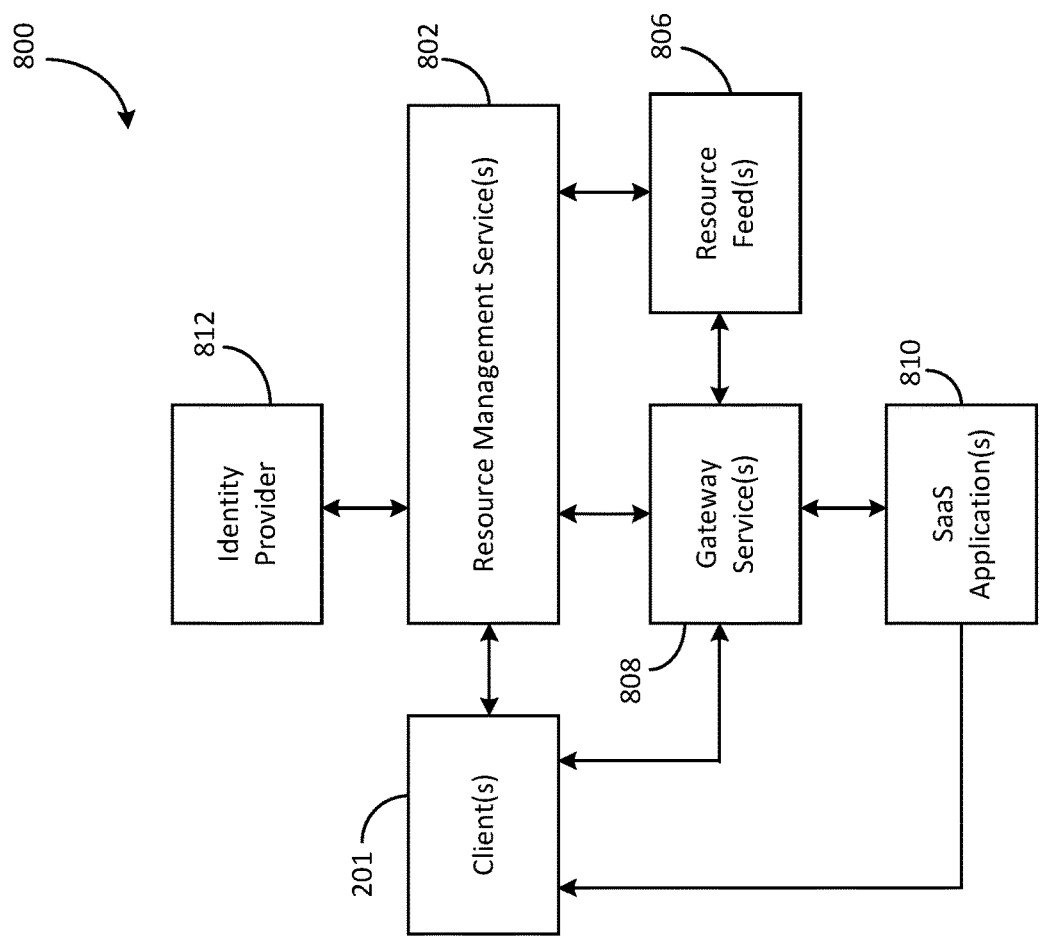
FIG. 8A is a block diagram of an example system in which resource management services may manage and streamline access by clients to resource feeds (via one or more gateway services) and/or software-as-a-service (SaaS) applications, in accordance with an implementation.
Figure 8B:
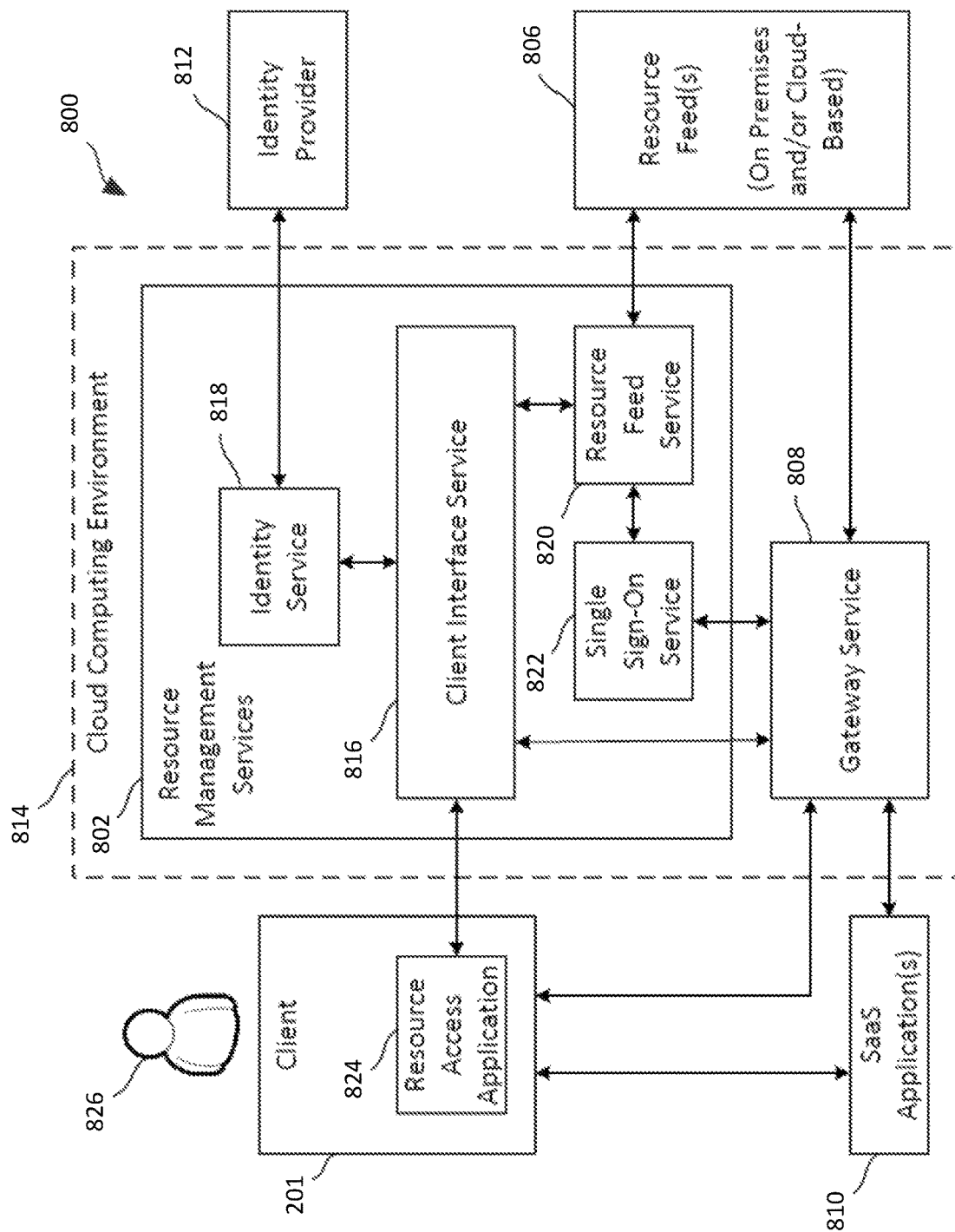
Figure 8C:
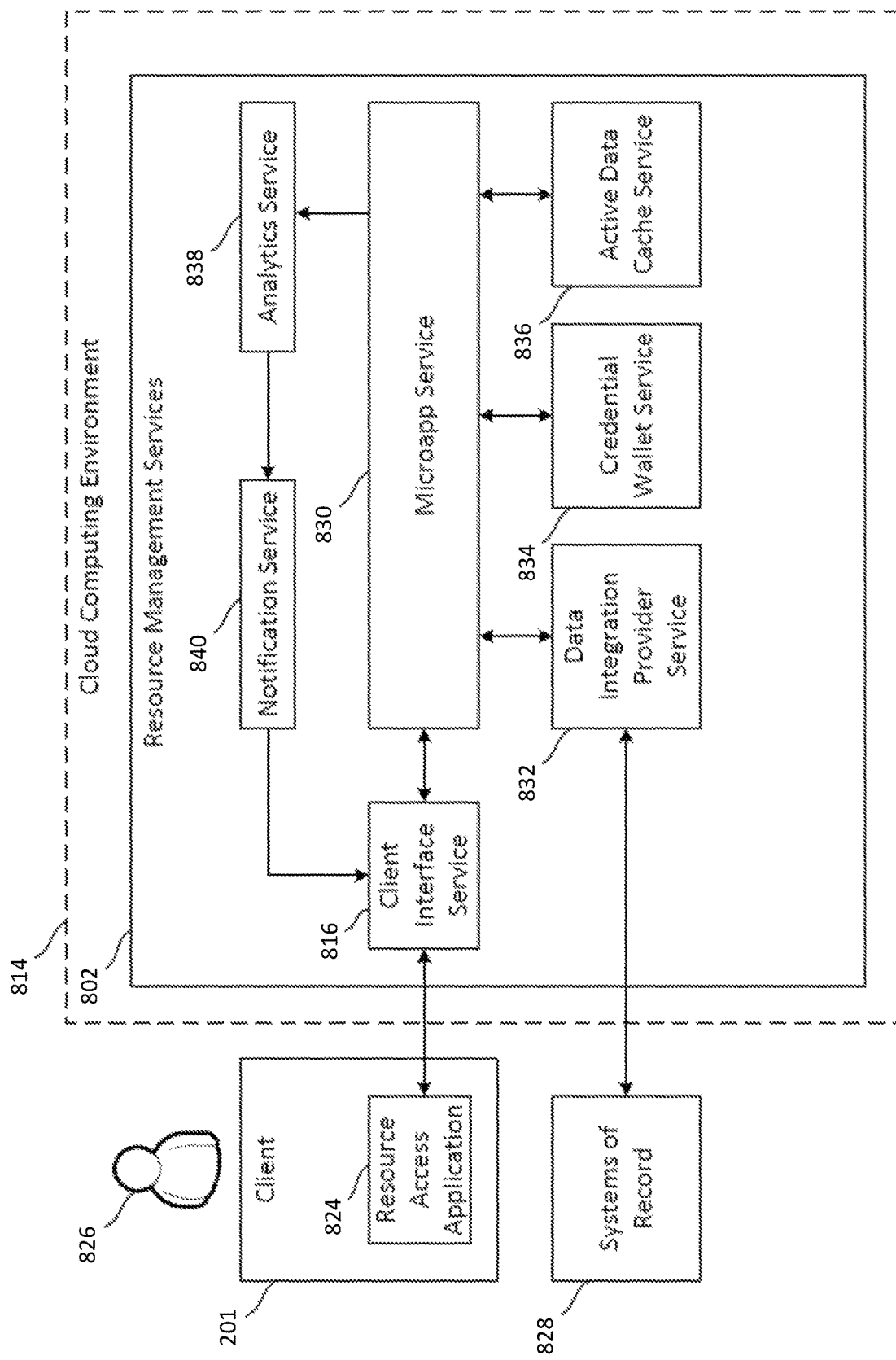

FIG. 8B is a block diagram showing an example implementation of the system shown in FIG. 8A in which various resource management services as well as a gateway service are located within a cloud computing environment, in accordance with an implementation; and FIG. 8C is a block diagram similar to that shown in FIG. 8B but in which the available resources are represented by a single box labeled "systems of record," and further in which several different services are included among the resource management services, in accordance with an implementation.

DETAILED DESCRIPTION

Due to the numerous number of authentication methods, there are significant challenges to secure client devices from potential access from other individuals using one of the authentication methods. In particular, different authentication methods may have different levels of security, such as an identification of a residential address or user's birthday that may be easily compromised, compared to a cryptographic token that may be difficult to compromise. Naive implementations attempting to balance security and convenience may end up too far in either direction, with low security but high ease of use, or with higher security than necessary at the expense of usability.

The present disclosure provides systems, methods, and apparatus for contextual access control. Contextual access control can enhance authentication security based on contextual factors, such as the location of the client device, differences between the location of the client device and the user (e.g., mobile device of the user), and network connection utilized by the client device. These contextual factors can define the risk level of the client device and dynamically adjust the context score of each authentication technique or the score threshold accordingly. By adjusting the context score or the score threshold, the present disclosure can improve the security level of the client device and mitigate the compromisation of the client device. During low risk situations, the present disclosure may require less authentication, thereby enhancing user experience in accessing an item of content.

For purposes of reading the description of the various embodiments below, the following descriptions of the sections of the specification and their respective contents may be helpful:

Section A describes a computing environment which may be useful for practicing embodiments described herein; and Section B describes systems and methods for contextual confidence scoring-based access control.

A. Computing Environment

Prior to discussing the specifics of embodiments of the systems and methods for contextual access control, it may be helpful to discuss the computing environments in which such embodiments may be deployed.

Figure 1:
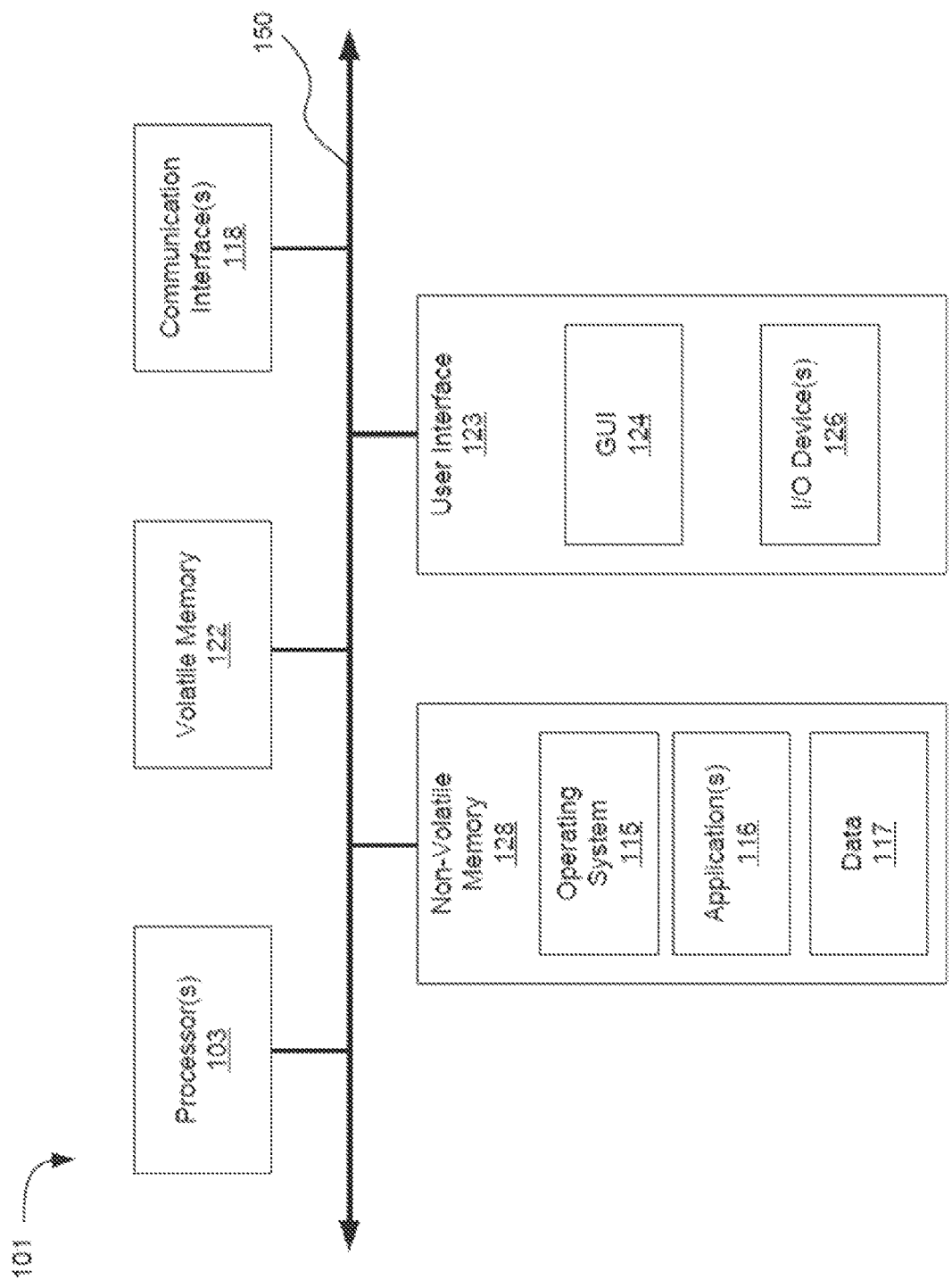
FIG. 1 is a block diagram of embodiments of a computing device.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor (s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Systems and Methods for Contextual Access Control

Naive authentication systems, such as using an account name and password, may be insufficient in many instances. For example, account names and passwords may be obtained by a malicious individual, who may then gain access to data allegedly protected by such authentication systems. Conversely, more secure authentication systems using biometric identifiers, two-factor authentication, one-time passcodes, etc. may be highly secure and resistant to hackers, but may be inconvenient or frustrating to use and may be more secure than necessary in many instances. By utilizing implementations of a context-aware authentication system as discussed herein, convenience and security may be dynamically balanced based on circumstances as they change. For example, additional authentication techniques or stronger authentication techniques may be required when a user is working on a publicly-accessible computing device or network (e.g. hotel wireless network, library or Internet cafe computer, etc.) or a device that may be easily misplaced (e.g. smartphone), because there is a higher risk of that a device or user account will likely be compromised due to loss of physical control of the device or malicious actors stealing user credentials. In contrast, fewer authentication techniques or easier-to-use authentication techniques may be required when the user is working on a more secure environment (e.g. desktop computer attached to a corporate wired network at an office that has physical access restrictions and guards).

The present disclosure is directed towards systems, methods, and apparatus for contextual access control. A contextual confidence score can generally be an indication of strength or risk level of a respective authentication technique based on the context of the client device. The context can include the location of the client device, which authentication technique is selected to verify the identity of the authenticator, and how was the authentication technique verified. One or more client devices can be verified and accessed via similar types of authentication techniques. The systems and methods can evaluate the confidence level (e.g., via the context score) of one or more authentication techniques by factoring in at least the context of a client, a client device, and a network connection during the authentication attempt. In some implementations, the systems and methods can compare a context score of a successful authentication to a criterion or a score threshold to provide access to an application or a device for the client. In some implementations, the systems and methods can remove a one-time password ("OTP") or another authentication technique from a list of available authentication techniques or mechanisms with the current context due to a low context score, and add the aforementioned back to the list in response to a change in context. In some implementations, the context score can be leveraged to i) strengthen the security level by enhancing an authentication technique; ii) identify any anomalies or abnormalities in the utilization of the authentication technique; and iii) reducing or removing trust from one or more authentication techniques based on the context score.

Figure 2:
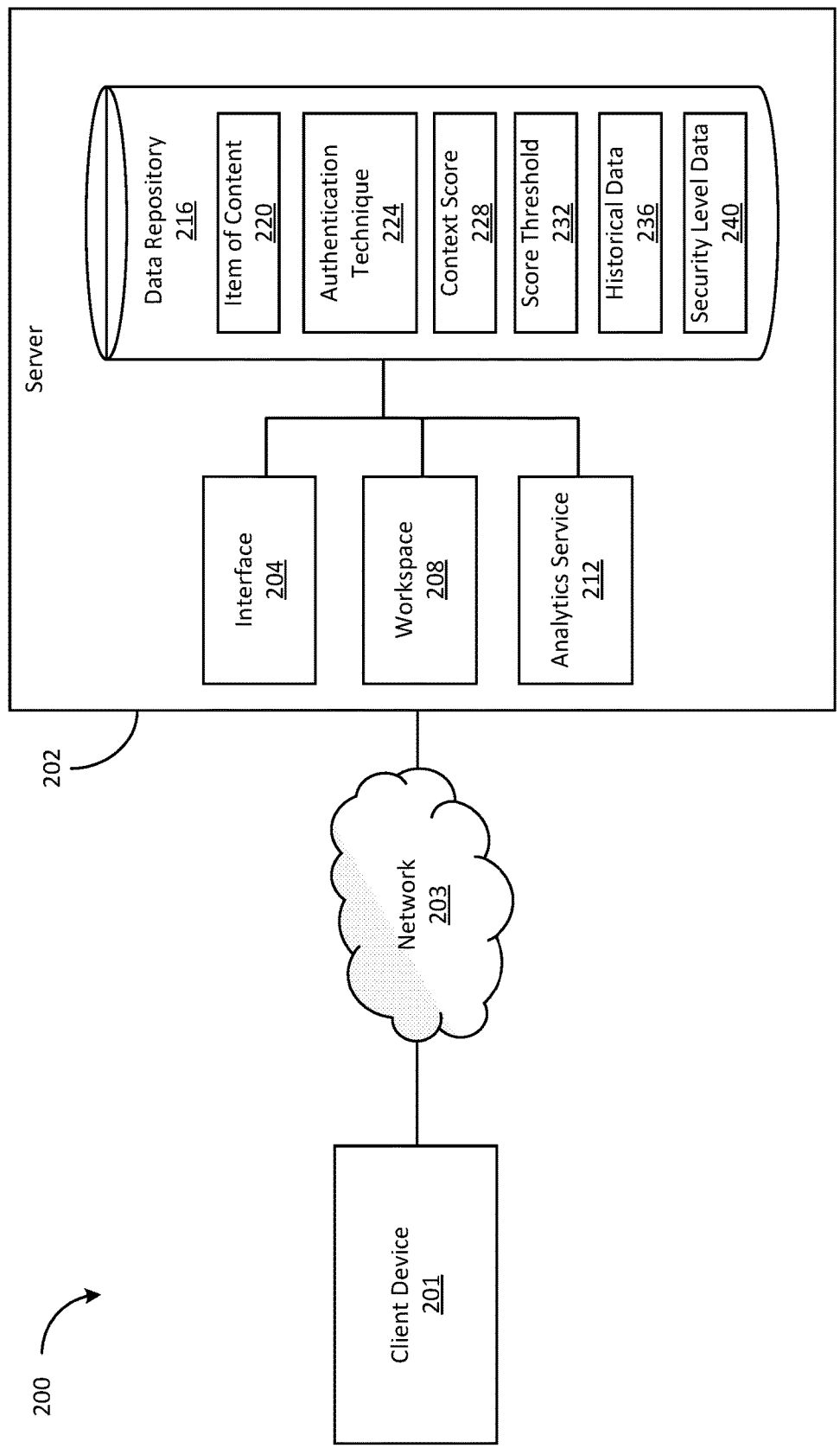
FIG. 2 is a block diagram of an example system for contextual access control, in accordance with an implementation.

Referring to FIG. 2, depicted is a block diagram of one embodiment of a system 200 for contextual access control. The system 200 can include a client device 201, a server 202, and a network 203 to provide a connection between the client device 201 and the server 202. The client device 201 and the server 202 can include one or more hardware components, or a combination of hardware and software in connection with FIG. 1. The client device 201 and the server 202 can include one or more processors and one or more memory storage. The one or more hardware components, or the combination of hardware and software can perform or operate one or more features and functionalities similar to one or more elements or components in connection with FIG. 1. The client device 201 can include any application, program, library, script, task, service, process, or any type and form of executable instructions executing on the hardware of a client device 201 (e.g., the client applications). The server 202 can include any application, program, library, script, task, service, process, or any type and form of executable instructions executing on the hardware of the server 202. The hardware can include circuitry such as one or more processors in one or more embodiments. Hardware components can be in electrical communication with the one or more other hardware components.

The network 203 can provide a communication channel between the client device 201 and the server 202. The network 203 can provide a connection between an application software of the client device 201 to the server 202. The network 203 can represent one or more intermediary devices configured to receive or transmit one or more data packages. The data package (e.g., data packet) can include, for example, a header, a payload, and a trailer. The network 203 can represent a path between the client device 201 and the server 202. The path can include multiple layers, such as an application layer, presentation layer, and other layers to provide data flow. For example, the network 203 can compress, reformat, convert, or otherwise forward the data packages received from the client device 201 for transmission to the server 202. The server 202 can unzip, decompress, reformat, or otherwise convert the data package from the client device 201. The network 203 can perform similar features in response to receiving one or more data packages from the server 202 designated to the client device 201. In some implementations, the network 203 can provide one or more communications channels between the client device 201 and one or more devices for intercommunication.

The client device 201 can be a mobile device, a desktop, a laptop, a tablet, or a wearable device configured to request access to an item of content. The client device 201 can include a client application installed or operating on the client device 201. The client device 201 can include an embedded browser that can render the information of a network application accessed via the client application. The client device 201 can be used by an operator to initiate the client application and the embedded browser. The network application may include any type or form of network application running on the client device at a first host to provide communication to one or more applications running on a different host than the first host. The client device 201 can initiate a communication channel with the server 202 via the network application. The network application can include email programs, file transfer port, terminal emulation, and other applications of a computer network.

The client device 201 can be operated by an operator to transmit, via a network interface in communication with the server 202, a request to the server 202 to access an item of content. The client device 201 can transmit the request via the network 203. The item of content can include, for example, an application or a software installed on the client device 201, a resource file, or an online resource on a webpage. With the request, the client device 201 can transmit data (e.g., in the form of data packages), for example, including location data, network context, and hardware context. The network context can indicate the network connection connected by the client device 201, such as free public network Wi-Fi, Long-Term Evolution ("LTE") network, office network, home ethernet, or other network connection used by the client device 201 to access to send the request. The hardware context of the client device 201 can indicate one or more authentication techniques supported by the client device 201, such as biometric identification (e.g., FaceID and TouchID), email identification or verification, one-time code ("OTC") automatically generated by a workspace, geolocation comparison, notification confirmation, passcode, password, pattern unlock, or no authentication. The aforementioned data and contexts can be contributed as contextual factors to determine a context score of authentication techniques supported by the client device 201.

The client device 201 can receive one or more authentication requests from the server 202 via the network 203 in response to transmitting the request to access a resource available via or otherwise from the server 202. The one or more authentication requests can utilize one or more corresponding authentication techniques. For example, the client device 201 can receive a first authentication request for a password and a second authentication request for a FaceID. The operator of the client device 201 can provide an input indicative of the password to the client device 201. The client device 201 can transmit a first response indicative of the password to the server 202. The client device 201 can transmit a second response indicative of the FaceID (e.g., sensor data from an imaging sensor of the client device 201) to the server 202. The client device 201 can receive an indication of one or more responses from the operator or a software (e.g., code or script) executing on the client device 201. The software can be configured to provide one or more responses to the server 202 responsive to receiving the one or more authentication requests. The client device 201 can transmit one or more responses sequentially or in parallel, depending on what the case may be.

In some implementations, the client device 201 can transmit, to the server 202, one or more responses to the one or more authentication requests simultaneously. For example, and referring to the previous example, the client device 201 can initiate an imaging sensor to continuously receive image data of an operator of the client device 201. While the imaging sensor is active, the client device 201 can receive an indication of a response indicative of the password. In this case, the client device 201 can transmit one or more responses to the server 202 simultaneously. In some implementations, the client device 201 may receive an authentication request including multiple authentication techniques to be performed in parallel for verification.

In some implementations, the client device 201 can receive a request, from the server, to select one or more authentication techniques for verification. The selection request can be displayed on an interface component of the client device 201. The interface component can display the one or more authentication techniques compatible with the client device 201, such as multi-factor authentication ("MFA") technique, password, passcode, or biometric authentication technique. The operator of the client device 201 can select the one or more authentication techniques presented on the client device 201. In response to the selection, the client device 201 can transmit a response indicating the selected one or more authentication techniques to the server 202. Subsequent to transmitting the response, the client device 201 can receive one or more authentication requests utilizing the selected authentication techniques.

In some implementations, the client device 201 may provide a response to a first authentication request that is unsuccessful in authenticating an authentication technique associated with the first authentication request. For example, the response to the authentication request may include an incorrect password or pin, mismatched fingerprint, or incorrect facial structure (e.g., as compared to the registered facial structure on the client device 201) indicative of unsuccessful authentication. In another example, the client device 201 may timeout from providing a response to the authentication request. In this case, the workspace 208 may not receive a response from the client device 201 within a predetermined time, such as 1 minute, 5 minutes, 10 minutes, 1 hour, etc. Some authentication techniques may include a shorter predetermined time, for example, push notification may request a response within 1 minute, password verification may request a response within 10 minutes, and email verification may request a response within 1 hour. The predetermined time may be configured by an administrator of the server 202. In response to the unsuccessful authentication, the client device 201 may receive an indication or a notification from the server 202 indicating unsuccessful authentication.

The client device 201 may receive a second authentication request utilizing the authentication technique similar to the first authentication request. In some implementations, the second authentication request can utilize the same authentication technique as the first authentication request. The same authentication technique may be utilized until a predetermined limited attempt, e.g., configured by the administrator of the server 202, for example. In some other implementations, the second authentication request can utilize a different authentication technique from the first authentication request. The server 202 may select the authentication technique responsive to the unsuccessful authentication attempt, for example, based on the context score required to exceed a score threshold (e.g., context score threshold), the most utilized authentication technique, or selection received from the client device 201. In some implementations, the client device 201 may receive an authentication request utilizing a different authentication technique responsive to exceed a predetermined attempt threshold set by the administrator of the server 202. The client device 201 may continue to attempt the same authentication technique within the predetermined attempt. In some implementations, the client device 201 may exceed the predetermined attempt threshold for multiple authentication techniques. In this case, the client device 201 may be restricted by the server 202 from reattempting authentication, for example, until a predetermined timeframe (e.g., 1 day, 2 days, etc.), verification that the attempts were authorized (e.g., email confirmation), or reset password for the resource.

The client device 201 may transmit a second response (e.g., second verification attempt) to the server 202. In some cases, the client device 201 may receive an additional selection request to select one or more authentication techniques for verification. The client device 201 may transmit a response to the selection request indicating a selection of a second authentication technique. The selected second authentication technique may be similar to or different from the authentication technique associated with the first authentication request.

The client device 201 can receive the item of content in response to a sum of context scores associated with one or more authentication techniques satisfying or exceeding a score threshold. For example, the client device 201 can transmit one or more responses to the one or more authentication requests. Authentication requests can utilize an authentication technique associated with a context score that when successfully authenticated, contributes to the sum or other value of the context scores of the one or more authentication techniques. The context score for authentication techniques can include a value, a percentage, or a ratio. For example, a successful password can contribute 0.30, the fingerprint can contribute 0.75, and a home location can contribute 0.20 to the sum of the context scores. The score threshold can be predetermined as a value, a percentage, or a ratio, such as 1.00, 100%, or 2/2, but in other cases the threshold is dynamic. A dynamic threshold is adjustable or otherwise modifiable based on any of the factors previously mentioned above, such as context and/or the responses received from the client just to name a few.

In more detail, the context score of authentication techniques or the score thresholds can be dynamically configured based on the context of the client device 201. For example, the client device 201 may change location, network connection, or select an authentication technique not frequently used by the client device 201. The context score associated with one or more authentication techniques can increase or decrease based on the location, the network connection, or the frequency of authentication technique used. The context score can be reduced responsive to an unsuccessful authentication of an associated authentication technique.

In some implementations, the sum of the context scores may not satisfy the score threshold. In this case, the client device 201 may receive an additional authentication request utilizing an additional authentication technique. The authentication technique may be associated with a context score that, when aggregated with the sum of the context scores, satisfies the score threshold. The client device 201 can transmit a response to the additional authentication request. The response can result in a successful authentication. Accordingly, the client device 201 can receive the item of content in response to the sum of the context scores (including the context score associated with the additional authentication technique) satisfying or exceeding the score threshold.

The server 202 can include an interface 204, a workspace 208 (e.g., workspace platform), an analytics service 212, and a data repository 216. The interface 204 of the server 202 can include one or more interfaces to enable the client device 201 or a computer to access a computer network such as a Local Area Network (LAN), a Wide Area Network (WAN), a Personal Area Network (PAN), or the Internet through a variety of wired and/or wireless or cellular connections. The interface 204 can include one or more features and functionalities in connection with the user interface 123 or the communication interface 118 of FIG. 1. The interface 204 can provide electrical communication between one or more components of the server 202, such as the workspace 208, the analytics service 212, and the data repository 216. The interface 204 can establish a link with the network 203 to connect the server 202 to the client device 201.

The workspace 208 of the server 202 can transmit one or more browser applications to the client device 201. The workspace 208 may be referred to as a workspace platform. The workspace 208 can communicate with the client device 201 via a workspace application installed on the client device 201. The workspace application can include a secure browser for access by the client device 201 to request one or more resources from the workspace 208. The secure browser can refer to an internet browser having security exploits to protect network data and computer systems from breaches of privacy or malware. For example, the client device 201 may access a secure browser of the workspace application. Within the workspace application, the client device 201 can transmit, via the network 208, a request to access a resource or an item of content. The workspace 208 can retrieve the request (e.g., data packets) from the client device 201. Subsequently, the workspace 208 can transmit a response to the request from the client device 201, such as an authentication request to verify the identity of the user prior to providing access to the resource or the item of content. The workspace application, including the secure browser, may be downloaded onto the client device 201 from the server 202. The server 202 can store one or more items of content in the item of content storage 220 within the data repository 216. The secure browser can transmit one or more webpages or resources to the client device 201 in response to a request for a webpage. The workspace 208 can receive context data, one or more responses, and one or more inputs from the client device 201 (e.g., the workspace application on the client device 201) via the interface 204. The inputs can include an indication of mouse hover, click, or movements. The inputs can include one or more characters input (e.g., key presses), one or more search queries, or other indication of interaction from the client device 201 with the browser application (e.g., workspace application).

The workspace 208 can store one or more resources and information in the data repository 216. For example, the workspace 208 can store one or more items of content in an item of content storage 220, the one or more authentication techniques in an authentication technique storage 224, the context score in the context score storage 228, the score threshold in a score threshold storage 232, the historical data in a historical data storage 236, and a security level data in a security level data storage 240.

The workspace 208 can receive a request from the client device 201 to access an item of content via the network 203. The item of content can include a resource, such as accessing a webpage, a folder, or other resources private to a client. The workspace 208 can receive one or more data packets from the client device 201. The data packets can include one or more contextual factors of the client device 201 and the request for an item of content. For example, the client device 201 may transmit the request for the item of content concurrent to transmitting the location, hardware context, and network connection information of the client device 201. In some cases, the workspace 208 can continuously receive the one or more contextual factors during a session with the client device 201. By doing so, the workspace can be up-to-date. For example, the workspace 208 can receive a request from the client device 201 to navigate to a webpage. The workspace 208 can provide the webpage to the client device 201 in a session. During the session, the workspace 208 can continuously receive contextual factors from the client device 201, such as the location data and network connection data (e.g., network context or network connection context). The workspace 208 enables the client device 201 to indicate whether to transmit one or more information from the client device 201 to the server 202 to execute an application of the webpage. The client device 201 can opt-out of transmitting one or more client device information in response to the context of the client being indicative of high risk of loss of data and/or malicious activity.

The workspace 208 can select one or more authentication techniques associated with access to the item of content requested by the client device 201. The selection can be in response to receiving the access request from the client device 201. The workspace 208 can select the one or more authentication techniques from a pool or a list of authentication techniques. The authentication techniques can be associated with a context score. An example illustration of a list including authentication techniques and context scores can be seen in FIG. 3.

In some implementations, the workspace 208 can select one or more authentication techniques based on the context score. For example, the workspace 208 can select an authentication technique having the highest scores in view of the contextual factors, risk level, and available authentication techniques for the client device 201. If the context score of the first authentication technique does not satisfy or exceed a score threshold, the workspace 208 can select an additional authentication technique having the second highest score, and so forth. In some implementations, the workspace 208 can select one or more authentication techniques based on the frequency of usage. For example, workspace 208 can determine that the client device 201 utilized a first authentication technique 20 times, a second authentication technique 10 times, and a third authentication technique 5 times. In response to this determination, the workspace 208 can select the first authentication technique for user verification, for example. The workspace 208 can continue to select the next highest utilization rate, such as the second authentication technique and then the third authentication technique to satisfy the score threshold. The workspace 208 may utilize other means to select the authentication techniques, such as selection from the client device 201 or based on a predetermined setting to utilize one or more authentication techniques. The predetermined settings may be configured by the client device 201.

The workspace 208 can receive one or more responses to the one or more authentication requests from the client device 201. The one or more responses can include an indication of successful authentication or unsuccessful authentication for the one or more of authentication techniques. For example, the workspace 208 can transmit a password authentication technique to the client device 201. The password is created by an operator of the client device 201. The workspace 208 can receive a response from the client device 201 including multiple characters to compare with the password of the authentication technique. The workspace 208 can match the response to the password stored in the data repository 216. In response to a complete match between the response and the password, the workspace 208 can determine a successful authentication. On the other hand, if the workspace 208 identifies at least one mismatch between the response and the password, the workspace 208 can determine an unsuccessful authentication, for example.

In some implementations, in the example of transmitting an authentication request for a password, the workspace 208 can identify a correspondence score between the response and the password. For example, if one character is incorrect, the workspace 208 can transmit, to the analytics service 212, an indication to deduct the context score associated with the password authentication technique by a small value, such as 1%, 0.01, or ¹⁄₁₀₀. In another example, if all input from the response does not correspond or include at least one similar pattern as the authentication technique, the workspace 208 may transmit, to the analytics service 212, an indication to deduct a larger value from the context score associated with the password authentication technique, such as 20%, 0.2, or ²⁄₁₀. In some cases, the context score for authentication techniques may be reset after a period of time (e.g., a predetermined time, such as 1 year, 2 years, etc.), an update to the server 202, or based on a request to reset the context scores by the client device 201. Similar processes in determining whether a response is indicative of a successful or unsuccessful authentication can be applied to other authentication techniques, such as FaceID (e.g., via face recognition software), TouchID (e.g., via fingerprint recognition software), pattern, passcode, and other authentication techniques.

In some implementations, resetting the context scores can refer to altering the context scores of all authentication techniques to a default score. For example, the context score of an authentication technique may start at 50 and the score threshold may be set at 100. To satisfy the score threshold in this case, the workspace 208 can select or utilize two authentication techniques. From the effect of at least the contextual factors, historical authentication attempts, and indication of successful or unsuccessful authentication, the server 202 can adjust the context score of an authentication technique accordingly. After the aforementioned period of time, the server 202 may the context scores of the authentication techniques to their default scores. In some implementations, the workspace 208 can reset the context scores associated with an authentication technique in response to a request to reset the context score by the client device 202, such as after successful authentication and accessing the item of content. Resetting the context scores may be specific to the item of content the client device 201 is attempting to access. In some cases, resetting the context scores may be universal to all resources for the client device 201.

The workspace 208 can compare a sum of the context scores of the one or more authentication techniques having an indication of successful authentication in the one or more responses to a score threshold. For example, in response to determining that the one or more responses indicate successful authentications, the workspace 208 can aggregate, group or otherwise combine the context scores of the one or more authentication techniques that were successfully authenticated. The sum may be represented as a value, a percentage, or a ratio, such as 0.90, 90%, or ⁹⁄₁₀. In further example, the workspace 208 can receive a first response to a first authentication request utilizing a first authentication technique, and a second response to a second authentication request utilizing a second authentication technique. The first authentication technique can be associated with a context score of 0.50. The second authentication technique can be associated with a context score of 0.40. Responsive to determining successful authentications for the first authentication request and the second authentication request, the workspace 208 can add the two context scores to indicate a total of 0.90.

The workspace 208 can retrieve a score threshold from the score threshold storage 232. The score threshold may be associated with the client device 201, for example, based on the security level (e.g., determined from contextual factors) of the client device 201 and other contextual factors of the client device 201. The workspace 208 can compare the sum of context scores to the score threshold associated with the client device 201. For example, the context score can indicate a value of 0.89. Given the above example, responsive to comparing the sum of context scores associated with successfully authenticated authentication techniques, the workspace 208 can determine that the client device 201 may access the item of content stored in the item of content storage 220 or from some other resource (e.g., a remote resource, such as a hosted application on a remote server).

In some implementations, the workspace 208 can identify a score threshold of 0.95 for the client device 201. In this case, the workspace 208 can determine the client device 201 is not yet permissible to access the item of content. In some implementations, the workspace 208 can transmit an additional authentication request utilizing an additional authentication technique to the client device 201. The additional authentication technique can be selected via the client device 201. In some other implementations, the workspace 208 can reinitiate the authentication process by switching one or more authentication techniques to utilize for the one or more authentication requests. For example, if the first authentication technique is associated with a 0.5 context score, the second authentication technique is associated with a 0.4 context score, and the score threshold is at 0.95, the workspace 208 can determine to replace the second authentication technique with a third authentication technique associated with a 0.45 context score or higher. In some implementations, the workspace 208 can replace the authentication technique including a higher context score. The score threshold can be predetermined or dynamically configured by the analytics service 212 based on the contextual factor of at least the client location, the client device 201 location, or the network connection context.

The workspace 208 can provide or otherwise enable access to, responsive to the sum of the context scores satisfying or exceeding the score threshold, the item of content to the client device to improve authentication security of the item of content, the client device 201, and the application installed on the client device 201. The workspace 208 can retrieve the item of content form the item of content storage 220 in the data repository 216. In some implementations, the workspace 208 can transmit an instruction to the analytics service 212 responsive to the sum of the context scores satisfying or exceeding the score threshold. The instruction can include a command to update the risk level (e.g., security level data) associated with the client device 201 and one or more context scores associated with one or more authentication techniques utilized by the authentication requests. The risk level may affect the threshold score for accessing an item of content by the client device 201. A high risk level can increase the score threshold, while a low risk level can decrease the score threshold, for example. The risk level associated with the client device 201 can be stored in the security level data storage 240. For example, if the client device 201 is attempting the access the item of content for the first time, the analytics service 212 can determine a high risk level for the client device 201, increasing the normal score threshold from 1.00 to 1.20. Responsive to successfully authenticating the client device 201, the analytics service 212 can reduce the score threshold back to the normal score of 1.00, for example. Subsequent to multiple successful authentications of the client device 201 (e.g., having similar contextual factors), the analytics service 212 can decrease the score threshold from the normal score of 1.00 to 0.80, for example. The increase or decrease in the score threshold may depend on the number of successful or unsuccessful authentication of the one or more authentication requests. Hence, by utilizing context score (e.g., confidence score) associated with an authentication technique, the system 200 can enhance the security of accessing at least the item of content.

The workspace 208 can receive an indication of risk levels (e.g., security level) corresponding to the client device 201 from the analytics service 212. The risk levels can be stored in the security level data storage 240. For example, based on one or more contextual factors or information from the client device 201, the workspace 208 can consult the analytics service 212 for risk levels corresponding to the client device 201. The risk levels can be indicated by a table or a list of authentication techniques and context scores associated with the authentication techniques. The list of authentication techniques and context scores may be referred to as, or used interchangeably with other descriptive terms, such as authentication list, risk level list, score list, or context list. The list may be referred to as a table. The context factors can be used to determine a context score associated with at least one of the authentication techniques. The context factors can include device location context, client location context, network context, and hardware context of the client device 201. The device location context can refer to the location of the client device 201 used to request the item of content. The client location context can refer to the location of a second device indicative of the location of a client, such as a mobile device of the client. The network context can indicate a network connection accessed by the client device 201, such as a home network connection, work network connection, hotspot connection, free public WiFi network connection, or LTE network connection. The hardware context can include an indication of one or more hardware components or a combination of hardware and software components that support one or more authentication techniques. For example, the server 202 can receive data packets from the client device 201 indicating one or more sensors and software embedded or installed on the client device 201. The one or more sensors can include a fingerprint sensor, retina scan, or imaging sensor for FaceID. The software can include a firmware version or one or more applications installed on the client device 201 which can support the one or more sensors to perform the function of at least the fingerprint sensor, the retina scan, or the FaceID.

In some implementations, the workspace 208 can receive an authentication list updated by the analytics service 212 responsive to receiving the context factors from the client device 201. The workspace 208 can transmit one or more authentication requests utilizing one or more authentication techniques in the updated authentication list to the client device 201. The analytics service 212 can manage or configure the authentication list. For example, the analytics service 212 can update a context score of authentication techniques based on the utilization frequency of the authentication technique. For example, authentication techniques that are used most frequently may be considered as reliable to verify the client device 201. More frequently used authentication techniques may include a greater number of successful authentication attempts. Accordingly, the analytics service 212 can increase the context score of the frequently used authentication techniques. On the other hand, less frequently used authentication techniques may be considered as less reliable for verifying the client device 201, for example, due to fewer authentication attempts (e.g., successful or unsuccessful attempts) and lower probability of a verified user of the client device 201 to utilize these authentication techniques. Accordingly, the analytics service 212 may decrease the context score of the non-frequently used authentication technique. The analytics service 212 can monitor (e.g., continuously monitor) information receives from one or more devices and adjust the corresponding authentication list accordingly. The frequency or the count of selecting or using one or more authentication techniques can be stored in the historical data storage 236. The frequency or count can be saved or otherwise stored, for example as part of historical data.

In some implementations, the opposite may be the case for the increase in context scores based on the utilization frequencies of the authentication techniques. For example, if an authentication technique is utilized more often, there may be more chances of the credential for responding to the authentication request (e.g., password or pin) to be exposed to individuals other than the device owner. Therefore, as an example, context scores for the authentication techniques may be reverted to a default context score by the analytics service 212 (e.g. 50 for a password, 75 for fingerprint ID, and 85 for FaceID).

In some implementations, prior to transmitting the one or more authentication requests, the workspace 208 can transmit a selection request including the authentication list associated with the client device 201. The server 202 can include and store multiple authentication lists associated with respective devices in the data repository 216, for example. In this case, the authentication list can include one or more authentication techniques compatible with the client device 201. The one or more authentication techniques compatible with the client device 201 can refer to authentication techniques supported by the hardware or software of the client device 201. For example, some devices may not include a fingerprint sensor for fingerprint ID, but may include a high-resolution camera and a firmware to support the high-resolution camera for FaceID. Therefore, these devices are not compatible with fingerprint authentication, but are compatible with FaceID authentication. In some examples, the workspace 208 may not provide the context scores of the authentication techniques to the client device 201. The selection request can notify an operator of the client device 201 to select one or more authentication techniques in the authentication list.

In some implementations, the workspace 208 can consult a historical authentication table including a selection count of an authentication technique to access the item of content. The historical authentication table can be stored in the historical data storage 236. The count can represent the frequency of authentication techniques utilized in one or more authentication requests to the client device 201. The workspace 208 can compare a selection rate of the one or more authentication techniques to a threshold (e.g., a selection rate threshold). The selection rate threshold can be dependent on the selection rate between the authentication techniques. The analytics service 212 can increase the context score of at least one of the one or more authentication techniques in response to the selection rate of the one or more authentication techniques exceeding the selection rate threshold, or decrease the context score if the selection rate is lower than the selection rate threshold to provide more or less security for operation of the system.

For example, a first authentication technique can be represented with a selection rate of 5% and a second authentication technique can be represented with a selection rate of 70%. In this case, the analytics service 212 can increase the context score of the second authentication technique or decrease the context score associated with the first authentication technique. A similar scenario can be presented if the selection rate threshold is predetermined by the administrator of the server 202 to be 50%, such that a technique with greater than 50% (e.g., 70%) may increase in context score and a technique with lower than 50% (e.g., 5%) may decrease in context score. The context score can be an increase or decrease proportionally to the difference from the selection rate threshold. In view of the above scenario, as an example, the context score may decrease by 45% for the first authentication technique or increase by 20% for the second authentication technique.

In some implementations, the workspace 208 can receive a selection response from the client device 201 subsequent to transmitting the selection request. Based on the selected authentication techniques, the workspace 208 can notify the analytics service 212 to update the context score of the selected authentication technique. The analytics service 212 can store a count of the number of times an authentication technique is selected or utilized in the authentication request. Responsive to receiving the selection response including an indication of one or more authentication technique selected, the workspace 208 can transmit one or more authentication requests utilizing the one or more authentication techniques selected at the client device 201.

In some implementations, the workspace 208 can transmit an interface with an interactive element indicating a remember device request to the client device 201. The remember device request may be represented via a checkbox, for example, at the authentication interface. The authentication interface can refer to a page or a dialog box presented on the client device 201 for a user to enter one or more inputs, such as a password or a pin code. The workspace 208 can receive an interaction data from the client device 201 to remember the client device 201 (e.g., a click on the checkbox). For example, responsive to successful authentication, if the user requests to remember the client device 201, the server 202 can store the client device identifier, contextual factors of the client device 201 during the successful authentication, and authentication technique utilized for the successful authentication in the data repository 216. Thereafter, the server 202 may provide the item of content or resource to the client device 201 responsive to a request for the item of content having similar contextual factors as stored in the data repository, such as without requiring a password. In some cases, the server 202 may send a push notification instead of requesting a password for the remembered devices. Responsive to receiving the interaction data to remember the client device 201 and the sum of context scores exceeding the score threshold, the workspace 208 can notify the analytics service 212 to decrease the score threshold associated with the item of content and context data associated with the client device 201. The remember device request may include a predetermined time for remembering the device. For example, the administrator of the server 202 can configure the predetermined time to be 4 hours. The client device 201 may transmit a remember device request to the server 202 concurrent to transmitting a response to the authentication request. Within the predetermined time, the client device 201 may access the item of content without being required to reauthenticate. Once the client device 201 exits the item of content (e.g., logs out, force exit, or removed from the session) and the predetermined time has passed, the server 202 can transmit an authentication request to the client device responsive to receiving a request to access the item of content from the client device 201.

In some implementations, the workspace 208 can identify the location of the client device, the location of the client (e.g., via mobile device), and the network connection context. The workspace 208 can determine a context state based on the contextual factors. The context state can refer to combinations of contextual factors to determine a context score or a score threshold. For example, the client device 201 may be at a different location than a mobile device, such as at an office and at home, respectively. Based on the contextual factor of the client device 201 located at the office, the analytics service 212 can decrease the score threshold by, for example, 0.10 points or the workspace 208 can aggregate the context score of the office location. The aggregation of context score can be added to the context scores of successful authentication of the one or more authentication requests. In further example, responsive to determining the distance of the mobile device from the client device 201 or the location differences between the devices, the workspace 208 may decrease the aggregated sum of context score, or the analytics service 212 can increase the score threshold for the client device 201. Similar processes can be done to increase or decrease a context score or a score threshold responsive to receiving the contextual factors. The workspace 208 can store the location data of the client and the client device 201 and the network connection context in the historical data storage 236. The workspace 208 can identify a frequency the client device 201 requests access to the item of content at the location or using the network connection context retrieved from the historical data storage 236.

In some implementations, the workspace 208 can determine whether the sum of the context scores satisfy or exceed the score threshold for the client device 201 as follows. Denoting $C_i$ as the value of the context score (e.g., the contextual confidence score), the value can be represented as $0<C_i<1$. The score threshold ("$T_h$") can be referred to as a tolerance value for the sum of context scores, where $0<T_h<1$. The administrator can set a value for the score threshold. The score threshold value can be compared to the context score value. For example, if $C_i$ is greater than $T_h$, the authentication is considered to be successful. The analytics service 212 can increase the context scores associated with the respective authentication techniques or decrease the score threshold accordingly. The configuration of the context score and score threshold can be with respect to the context state or contextual factors of the client device 201. In further example, if $C_i$ is lower than $T_h$, the analytics service 212 can perform the following:

1) The workspace 208 can remove or disable the authentication technique associated with the context factor, such that the authentication technique may not be used until responsive to a change in context factor or context state. In some cases, the workspace 208 can notify the analytics service 212 to remove or disable at least one authentication technique. The authentication technique may be used again once the confidence score is higher. The authentication technique may be used again once the combination of changes in the context factor and a satisfactory confidence score is present, for example.

2) The workspace 208 can select one or more additional authentication techniques to verify the identity associated with the client device 201. The additional authentication technique can be sent, by the workspace 208, to the client device 201 responsive to the sum of context score lower than the score threshold. Subsequent to successful authentication of an additional authentication request utilizing the additional authentication technique, the workspace 208 can aggregate the sum of context scores with the context score from the additional authentication technique to determine whether to provide the item of content to the client device 201, for example.

3) The workspace 208 can notify the analytics service 212 to perform one or more actions. The actions can include at least reassessing the context score of authentication techniques with respect to the context state, provide an instruction to the workspace 208 to transmit a notification to the client device 201 to select an additional authentication technique, or instruct the workspace 208 to transmit a notification to the client (e.g., mobile device) indicating the location of the client device 201 and access attempt for the item of content.

In some implementations, the analytics service 212 can compare a context score to a context score threshold associated with an authentication technique. For example, if an initial context score is 0.5, an administrator can set a context score threshold of 0.3. After multiple unsuccessful attempts at authentication utilizing the authentication technique, the context score can fall below 0.3, such as 0.29. In this case, the analytics service 212 may not provide the authentication technique with an unsatisfactory context score to the workspace 208 for authentication. The context score of the authentication technique can increase, for example, by a successful authentication of the client device 201 having the context state, responsive to a predetermined time (e.g., 1 day, 1 week, or 1 month predetermined by an administrator of the server 202), or a request from the client device 201 to reset the context score of the authentication technique. Resetting the context score can include additional verification using at least the authentication technique of the context score to be reset. In some implementations, the one or more components of the system 200 can incorporate or include features and functionalities of one or more other components of the system 200. For example, the workspace 208 can perform and operate similar features as the analytics service 212, and vice versa.

The analytics service 212 can compare contextual factors of the client device 201 to a historical data table stored in the historical data storage 236, such as the location data, the network connection data, and the hardware component data. The historical data table can include at least one data set including a location identifier, a network connection identifier, and a hardware component identifier having access to the item of content. The analytics service 212 can perform this comparison to determine an actual score threshold for the client device 201. The actual score threshold can refer to an adjusted score threshold based on the context factor. In one example, the analytics service 212 can determine at least one match between the location data and the location identifier, the network connection data and the network connection identifier, or the hardware component data and the hardware component identifier. In response to at least one match, the analytics service 212 can decrease the score threshold. In another example, the analytics service 212 can determine that at least one of the above context factors does not match one of the historical context factors for the client device 201. Therefore, the analytics service 212 can increase the score threshold responsive to the determination of a non-match context factor or context state.

In some implementations, and referring to the above example, the analytics service 212 can increase the context score associated with at least one of the one or more authentication techniques in response to the location data matching the location identifier, the network connection data matching to the network connection identifier, or the hardware component data matching to the hardware component identifier. In some other implementations, still referring to the above example, the analytics service 212 can decrease the context score associated with at least one of the one or more authentication techniques in response to the location data not matching the location identifier, the network connection data not matching the network connection identifier, or the hardware component data not matching the hardware component identifier because such a mismatch can indicate a higher level of risk.

The analytics service 212 can perform one or more features or functionalities as described above. The analytics service 212 can determine a risk level or a risk change of the client device 201. The risk level can be based on the contextual factors of the client device 201. The risk change may be referred to as the changes in contextual factors, such as a location of network connection context. For example, the analytics service 212 can rank the risk level from 1 to 5 from low risk to high risk, respectively, based on an initial context data of the client device 201, such as the location of the client device 201 and the location of a mobile device associated with the user. Initially, the client device 201 may be at the same location as the user. The initial risk can be low for this instance. Before, during, or after the client device 201 transmits a request to access the item content, the client device 201 or the user may relocate to a different location (as determined by the mobile device location). The analytics service 212 can determine that the two devices are no longer in the same location and increase the risk level (e.g., security level) according to the distance between the two devices. For example, the analytics service 212 can increase the risk level i) to 2 at 100 meters between the two devices, ii) to 3 responsive to 300 meters distance, iii) to 4 responsive to 10 miles different, and iv) to 5 if the distance is greater than 100 miles.

Figure 7:
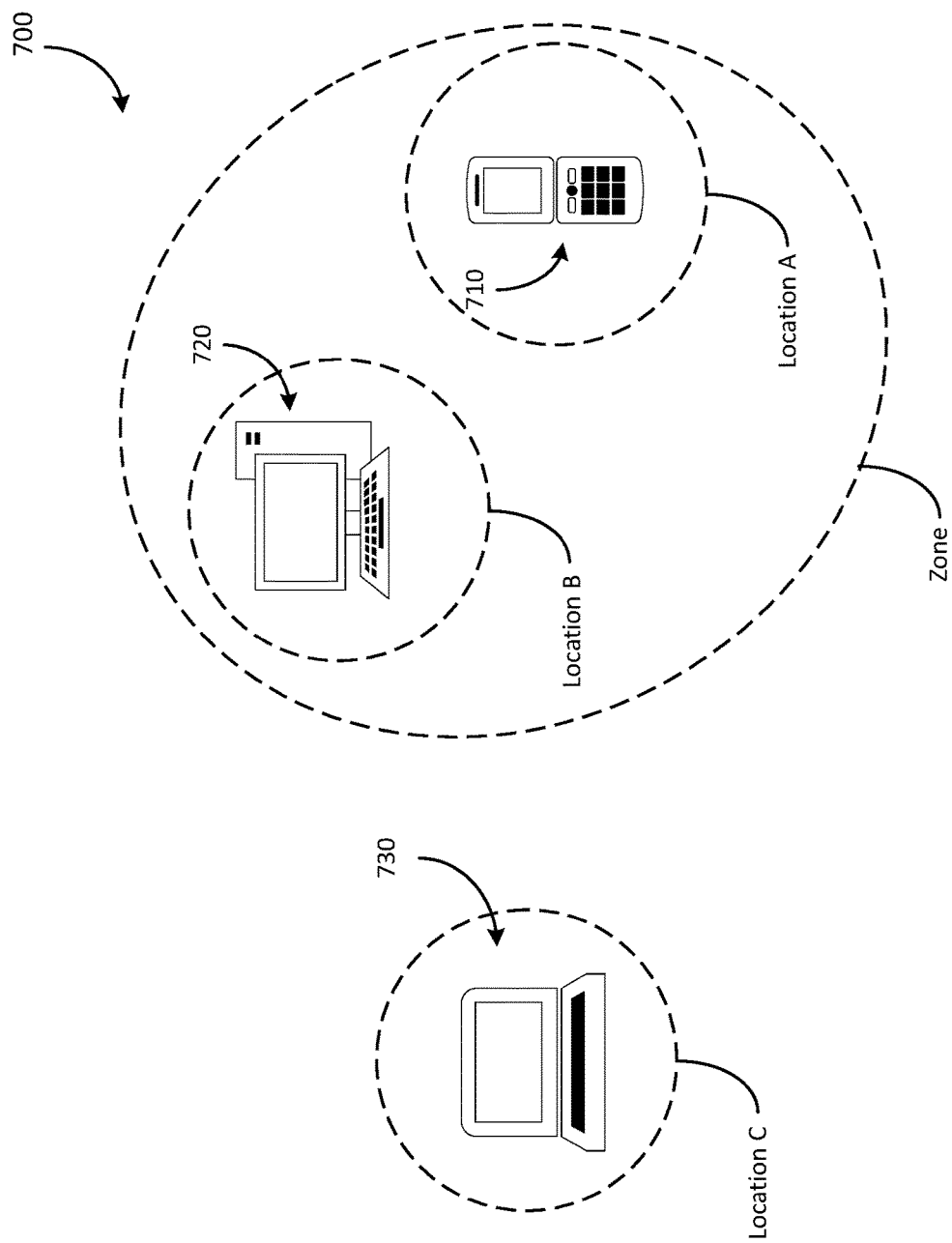
FIG. 7 is an example illustration of devices at different locations, in accordance with an implementation.

In some implementations, the risk level may not increase based on the historical context state or historical locations of the client device 201 location or the mobile device location. For example, the analytics service 212 can retrieve context state information from the historical data storage 236. Responsive to the changes in the client device 201 location or the mobile device location, the analytics service 212 can determine whether the client device 201 or the mobile device is at a previously recorded context state based on the locations of the client device and mobile device. For example, referring briefly ahead to FIG. 7, illustrated is an example of devices at different locations, such that correlations between their locations may be analyzed. Returning to FIG. 2, if the analytics service 212 determines that the client device 201 is successful in the authentication with the context state and using an associated authentication technique, the analytics service 212 may not increase the score threshold or decrease the context score associated with the authentication technique utilized in the authentication request.

The analytics service 212 can receive one or more instructions or indications from the workspace 208 to configure or adjust the context score or the score threshold. The indications can include any selection or authentication attempt from the client device 201, such as the selection of an authentication technique, the one or more authentication techniques utilized in the authentication request, or an indication of successful or unsuccessful authentication of the authentication technique. For example, in response to the workspace 208 determining a successful authentication using a first authentication technique and a second authentication technique, the analytics service 212 can increase the context scores associated with the first authentication technique and the second authentication technique. In some cases, the client device 201 may provide a successful authentication response via the first authentication technique and an unsuccessful authentication response via the second authentication technique. Based on the context state (e.g., the combination of contextual factors), the analytics service 212 can decrease the context score for the authentication technique. The analytics service 212 may increase the score threshold based on the context state. The analytics service 212 can adjust the context score of a respective authentication technique and the score threshold associated with the client device 201 based on any combination of context state, contextual factors, and other indication of successful or unsuccessful authentications.

In some implementations, the analytics service 212 can assign the context score to the one or more authentication techniques using an associated security level hashed from a lookup table. The lookup table can include security level data of authentication techniques. For example, the analytics service 212 can determine a security level of the client device 201 based on a contextual factor or a context state (e.g., one or more combinations of contextual factors, such as a location of the client device 201 with respect to a location of the user or other such location). The security level data can be stored in the security level data storage 240. The security level can be similar or corresponding to the risk level. The analytics service 212 can determine a high security level based on a network connection context indicating a connection to free public WiFi and the location of a mobile device distant from the location of the client device 201 (e.g., 5 miles, 10 miles, etc.). In this case, the analytics service 212 can either decrease the context score of an authentication technique selected or utilized in the authentication request or increase the score threshold for the client device 201. Adjusting the score threshold can be similar to adjusting all context scores associated with the authentication techniques. The association between the context score and the authentication technique can be referred to as a context score of an authentication technique (e.g., embedded in the authentication technique).

In some implementations, the success of authenticating one or more authentication techniques can be determined in sets. For example, the analytics service 212 can identify or determine a first set of one or more authentication techniques that are successfully authenticated and a second set of one or more authentication techniques that are unsuccessfully authenticated. In response to identifying the two sets, the analytics service 212 can increase context scores of authentication techniques in the first set and decrease context scores of each authentication technique in the second set.

In some implementations, the server 202 can receive an indication to remember the client device 201. In response to this indication, the analytics service 212 can decrease the score threshold associated with the item of content and context data associated with the client device 201.

An example of the context state with one or more authentication techniques can be represented as:

<AuthenticationMethod1, Context State1>
<AuthenticationMethod1, Context State2>
. . .
<AuthenticationMethod1, Context StateN>

In the above example, authentication techniques (e.g., authentication method) can be associated with or otherwise assigned to multiple context states. For example, a first context state of an authentication method for multi-factor authentication can include the mobile device and the client device 201 at the same location at home. In further example, a second context state can include the mobile device and the client device 201 at the same location at an office. In another example, a third context state can include the mobile device and the client device 201 at the same location in a public area (e.g., which can include a low context score or a high score threshold). In yet another example, a fourth context state can include the mobile device and the client device 201 located in different locations, such as at home and at the office, for example. The one or more context state for the authentication techniques can continue in similar behavior.

In some implementations, the context score can be included in each data set including an authentication technique and an associated context score as follows:

<AuthenticationMethod$_1$, Context State$_1$, Contextual Confidence Score$_{11}$>
. . .
<AuthenticationMethod$_1$, Context State$_2$, Contextual Confidence Score$_{12}$>
<AuthenticationMethod$_1$, Context State$_N$, Contextual Confidence Score$_{1N}$>
<AuthenticationMethod2, Context State$_1$, Contextual Confidence Score$_{21}$>
<AuthenticationMethod2, Context State$_2$, Contextual Confidence Score$_{22}$>
. . .
<AuthenticationMethod$_2$, Context State$_N$, Contextual Confidence Score$_{2N}$>

In view of the above, a first data set can include the authentication technique, the first context state, and the first context score. In this example, since the mobile device and the client device 201 are in the same location, the analytics service 212 can determine to include a higher context score with the first data set. Therefore, the context score (e.g., contextual confidence score) can be associated with or otherwise assigned to the context state. The higher context score can refer to an increase in the original context score of the authentication technique. In some implementations, an initial context score can be predetermined or otherwise configurable by an administrator of the server 202. Thereafter, the initial context score can be adjusted in view of the contextual factors, context state, or other information from at least the client device 201 or the client (e.g., mobile device).

In some implementations, the analytics service 212 can add a location into the historical data storage 236 to indicate that the location is often used by the client device 201. For example, the client device 201 can initiate or select a multi-factor authentication ("MFA") technique requiring a password and a passcode. The workspace 208 can transmit an authentication request utilizing the MFA technique. The password can be previously created by the operator or the user. The passcode can be generated at the time of initiating the MFA technique. The server 202 can identify a mobile device, which can represent the client location. The client device 201 may be referred to as a first device, and the mobile device may be referred to as a second device. The workspace 208 can send the auto-generated passcode to the mobile device at a different location from the client device 201, such as at home and at work, respectively. The client device 201 can respond with password input to the authentication request. In response to receiving the response from the client device 201, the workspace 208 can transmit a passcode (e.g., one or more authentication identifiers) request to the client device 201 located in the office and a generated passcode to the mobile device located at home, for example. The workspace 208 can receive a response from the client device 201 successfully authenticating the passcode. The analytics service 212 can receive an indication of successful authentication from the workspace 208. Accordingly, in this case, the location associated with the client device 201 successful authentications can be stored in the historical data storage 236, and the analytics service 212 can increase the context score associated with the MFA technique and the context state (e.g., the location of the client device 201 and the mobile device).

The data repository 216 can include the item of content storage 220, the authentication technique storage 224, the context score storage 228, the score threshold storage 232, the historical data storage 236, and the security level data storage 240. The item of content storage 220 can include data for one or more items of content. The items of content can include a webpage, a file, a folder, and other resources the client device 201 can request access to. The authentication technique storage 224 can include one or more tables with a list of authentication techniques. The tables can be arranged on a per device basis based on the hardware context indicating the compatibility with one or more authentication techniques. The analytics service 212 can configure, manage, or remove any authentication techniques from the list based on their context score or the device hardware context. The context score storage 228 can store the context scores of the authentication techniques. The context score can be managed by the analytics service 212. The historical data storage 236 can include a historical authentication table and historical data table. The historical authentication table can include a rate or a count of the utilization of authentication techniques in one or more authentication requests. The historical data table can include historical location data, historical network connection data, and other data from one or more devices, such as a rate that the client device 201 requests for access to the item of content. The security level data storage 240 can include a hash table of risk levels or security levels of a respective device. The hash table can include risk level of one or more contextual factors of the one or more devices, such as location, network connection, and hardware context (e.g., the risk level for using a non-frequently used or never used authentication technique).

Referring to FIG. 3, an illustration of an example table 300 with a list of authentication techniques and context scores is shown, in accordance with an implementation. The table 300 can be implemented, managed, or otherwise utilized by at least one or more components or elements of FIG. 1 and FIG. 2. The list may be referred to as an authentication list, a historical authentication list, or other similar descriptive terms to identify a list of authentication techniques and associated context scores. Table 300 can be stored in the data repository 216 as part of at least the authentication technique storage 224 and the context score storage 228, for example. The table 300 can correspond to the client device 201. One or more additional tables similar to table 300 can be stored in the data repository 216 corresponding to a respective device.

The authentication techniques can be added, removed, or updated by the analytics service 212 of the server 202. The authentication techniques can include any available authentication techniques for verifying the identity of a user, such as pattern identification, passcode, password, anti-bot validation (e.g., to mitigate bots attempts to access the item of content, such as a profile account of a user), verification code for multi-factor authentication, fingerprint (e.g., fingerprint ID), and FaceID. In some cases, contextual factors, such as location data (e.g., home or office) and network connection context (e.g., home network or office network) can be listed as authentication techniques. The network connection context may indicate that the client device 201 has previously been verified. For example, the analytics service 212 can remove one or more authentication techniques based on a hardware context of the client device 201. The hardware context can indicate the compatibility of authentication techniques with the client device 201. The analytics service 212 can remove at least one authentication technique based on the context score. For example, the context score may fall below a context score threshold. Accordingly, the analytics service 212 can remove the authentication technique with the context score below the context score threshold. The analytics service 212 can add the authentication technique back in the table 300 once the context score satisfies or exceeds the context score threshold.

The context score of the authentication techniques can be adjusted by the analytics service 212 based on the contextual factor of the client device 201. For example, responsive to determining the client device 201 location to be at home, the context score of one or more authentication techniques can increase by 20. If the location is at the office (e.g., recorded or assigned by the user), the context score of one or more authentication techniques can increase by 10. In some implementations, the location can be added to the sum of context scores responsive to summing the context scores of one or more successful authenticated techniques.

In some implementations, the table 300 can include a context state with the authentication techniques. For example, authentication techniques can include a context score associated with a context state as follows:

1) Context state: device location=home; mobile device location=home; context score=70.
2) Context state: device location=office; mobile device location=home; context score=50.
3) Context state: device location=unknown; mobile device location=home; context score=10.
4) Context state: device location=home; mobile device location=unknown; context score=25.
5) Context state: network connection=home; device location=home; mobile device location=home; context score=90.
6) Context state: network connection=Free Public WiFi; device location=near office; mobile device location=office; context score=45.
7) Context state: etc. . . .

The listing above are examples of possible context scores for the context states (e.g., a combination of context factors) and one of the authentication techniques, and may not represent the actual scores for the scenario above. In some cases, the location of the client device 201 and the mobile device may be represented as the network connection the devices are connected to. In some implementations, one or more components or elements can further manage the table 300, as referred to in FIG. 2.

Figure 4:
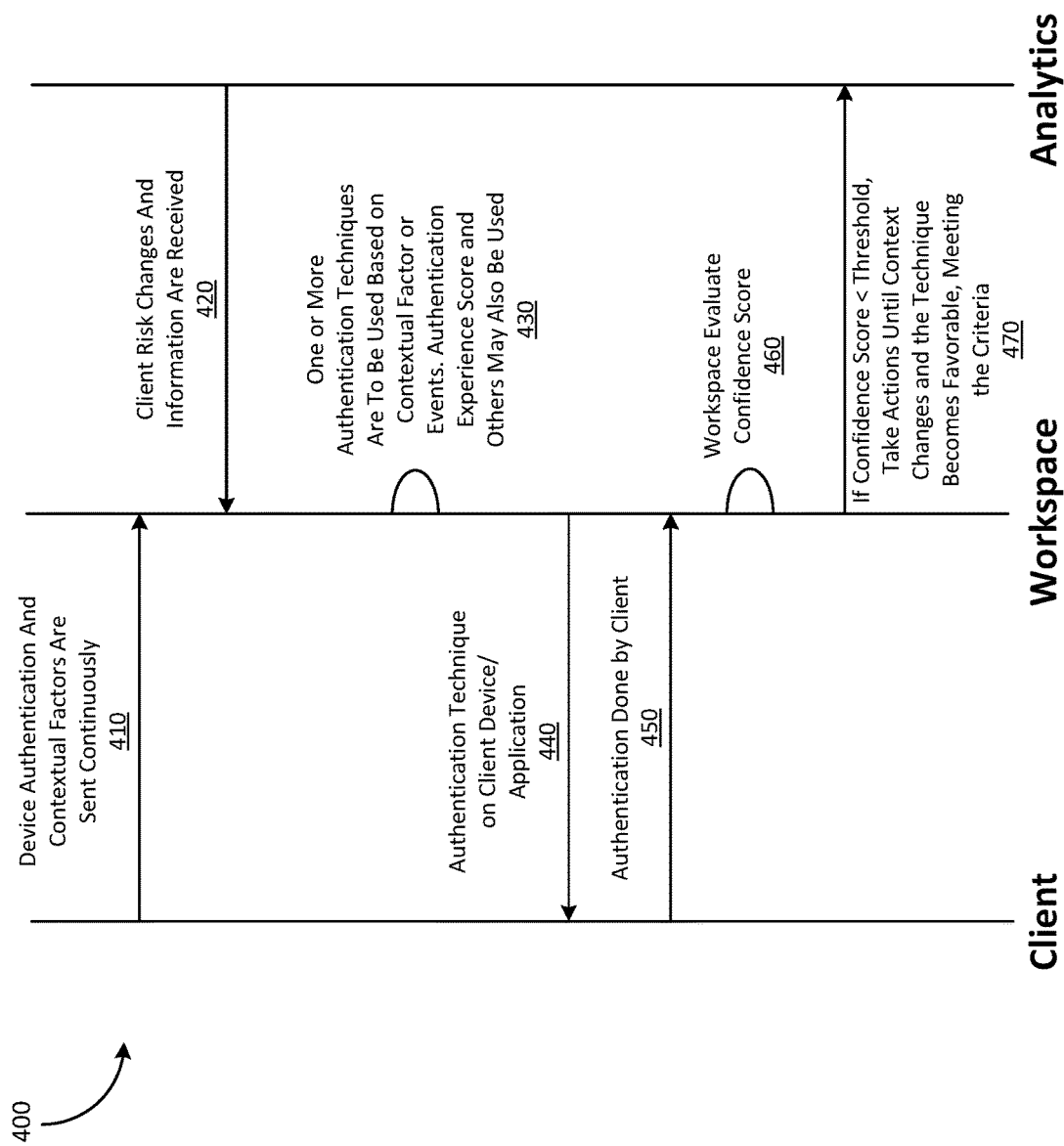
FIG. 4 is a signal flow diagram of an example method for contextual access control, in accordance with an implementation.

Referring to FIG. 4, a signal flow diagram 400 of an example method for contextual access control is shown, in accordance with an implementation. The signal flow diagram 400 can represent a method for multi-factor or nFactor authentication. The method can be performed by the client device, the workspace (e.g., workspace platform), and the analytics (e.g., analytics service); the workspace and analytics functions may be provided by the same computing device (e.g. server) or different computing devices (e.g. remote servers, a cluster or farm of servers, virtual computing devices deployed in a cloud, etc.). The example method of the signal flow diagram 400 can be performed or operated by one or more components or elements as in FIGS. 1-3. At operation 410, the server 202 can continuously receive device authentication request and contextual factors from the client. The contextual factors can include device location context, client location context, network context, and hardware context. The device location context can include an approximate or general area of the device transmitting the authentication request.

At operation 420, the workspace can receive client risk changes and information from the analytics. Based on the risk, the workspace can determine that an authentication technique may be sent to the client to perform, for example, MFA or nFactor technique upon changes in the risk level, risk score, or security level. The risk changes can include changes in the context factor of the client, such as changes in the location and the network context. Risk information (e.g., security level or risk level) can be based on one or more context factors, context states, and other information stored in the security level data storage 240. In some implementations, receiving the risk changes and information can refer to receiving a table including a list of authentication techniques associated with context scores.

At operation 430, the workspace can determine one or more authentication techniques to be used based on the contextual factors or events from the client device, such as the MFA technique. The workspace can determine the one or more authentication technique to use based on a request from the analytics, such as to utilize the MFA technique. The workspace can select one or more authentication techniques from the table including the authentication technique list. For example, the workspace can select at least one authentication technique associated with the highest context score, such as a biometric authentication technique or a password with a high security level. Passwords with a high security level can include multiple numbers, characters, and special characters. The workspace can select the one or more authentication techniques based on the authentication experience score (e.g., utilization rate and success rate). In this case, the workspace can automatically select the most frequently used authentication technique to transmit to the client. In some implementations, the workspace can transmit a list of authentication techniques compatible with the client device for presentation on a user interface. The workspace can receive a selection response indicating at least one authentication technique to utilize. The workspace can transmit an authentication request to the client utilizing the authentication technique.

At operation 440, the workspace can transmit at least one authentication technique to the client. Transmitting the at least one authentication technique can refer to transmitting an authentication request utilizing an authentication technique. In some implementations, the workspace can transmit multiple authentication techniques in succession. For example, the workspace can transmit a first authentication technique to the client. The workspace can transmit a second authentication technique to the client subsequent to receiving an indication that the authentication is done by the client (e.g., an authentication response). The workspace can transmit a third authentication technique and so forth in a similar manner. In some implementations, multiple authentication techniques can be transmitted for verification concurrently. For example, the workspace can transmit a password technique and an MFA technique for a signal authentication response. For the MFA technique, the workspace can identify a second device, such as a mobile device associated with the client to transmit an OTP or an auto-generated code. The workspace can transmit an authentication request to the client requesting the OTP or the auto-generated code.

In some implementations, the workspace can utilize an authentication experience score for the MFA technique. The authentication experience score can indicate the rate or frequency of the client use the authentication technique. For example, by determining the rate or frequency of use, the workspace may prepare an additional authentication request including an additional authentication technique for the client, in the case of low frequency.

At operation 450, the workspace can receive an authentication response done by the client. The authentication response can be responsive to the one or more authentication techniques. The workspace can determine or evaluate one or more successful authentications for one or more authentication techniques (e.g., a first set of successful authentication). The workspace can determine one or more unsuccessful authentications for one or more authentication techniques (e.g., a second set of unsuccessful authentication). For example, the workspace can receive a first authentication response including a username and a password. In response to a successful authentication via the first authentication response, the workspace can transmit a second authentication request to the client requiring a code from a second device. The workspace can receive the code to successfully authenticate the MFA technique.

At operation 460, the workspace can evaluate a confidence score (e.g., context score). For example, based on the first set of successful authentication, the workspace can sum the context scores associated with the authentication techniques in the first set. The workspace can compare the sum of the context scores to a score threshold. The score threshold can be stored in the score threshold storage. The score threshold can be determined by the analytics, for example, during risk level analysis. The score threshold can be predetermined by an administrator of the server. The score threshold can be dynamically configured based on the security level. For example, if the analytics identify a high security level for the client, the score threshold may increase (e.g., requiring more context score to authenticate the client). If the analytics identify a low security level for the client, the score threshold may decrease.

The workspace can transmit an instruction or an indication for the analytics to perform an action based on the total confidence score (e.g., total context score) greater than a score threshold. For example, the analytics can increase the context score of an authentication technique utilized to authenticate the client, such as the MFA authentication technique. The selection or utilization of authentication techniques can be recorded in the historical data storage. One or more indications of successful or unsuccessful authentication can be recorded in the historical data storage. In some implementations, responsive to the total confidence score satisfying or exceeding the score threshold, the workspace may not instruct the analytics to perform an action. Instead, the workspace can provide access to the item of content to the client.

At operation 470, the workspace can transmit an instruction or indication for the analytics to perform an action based on the total confidence score less than a score threshold. Referring to the second set of unsuccessful authentication, the workspace can instruct the analytics to trigger an additional authentication technique to be utilized. In some cases, the workspace can instruct the analytics to update context scores of one or more authentication techniques utilized in the authentication (e.g., reduce the context scores). The workspace can instruct the analytics to remove the authentication technique from the table of authentication list based on the associated context score falling below a context score threshold until a context changes occur. The authentication technique can be added back to the table in response to the context change, the context scores satisfying or exceeding the score threshold, or a combination of the context change and the context score increase. In some other cases, the workspace can perform the above features and functionalities without notifying the analytics service. The analytics can utilize at least the historical data, the context factor, the context state, the risk level, and other information from the client to update a context score associated with an authentication technique and a context state. The client is notified that one or more information can be utilized for the authentication process. The client is provided an option to opt-out of information collection. The client information is stored on the data repository upon approval from the client.

Figure 5:
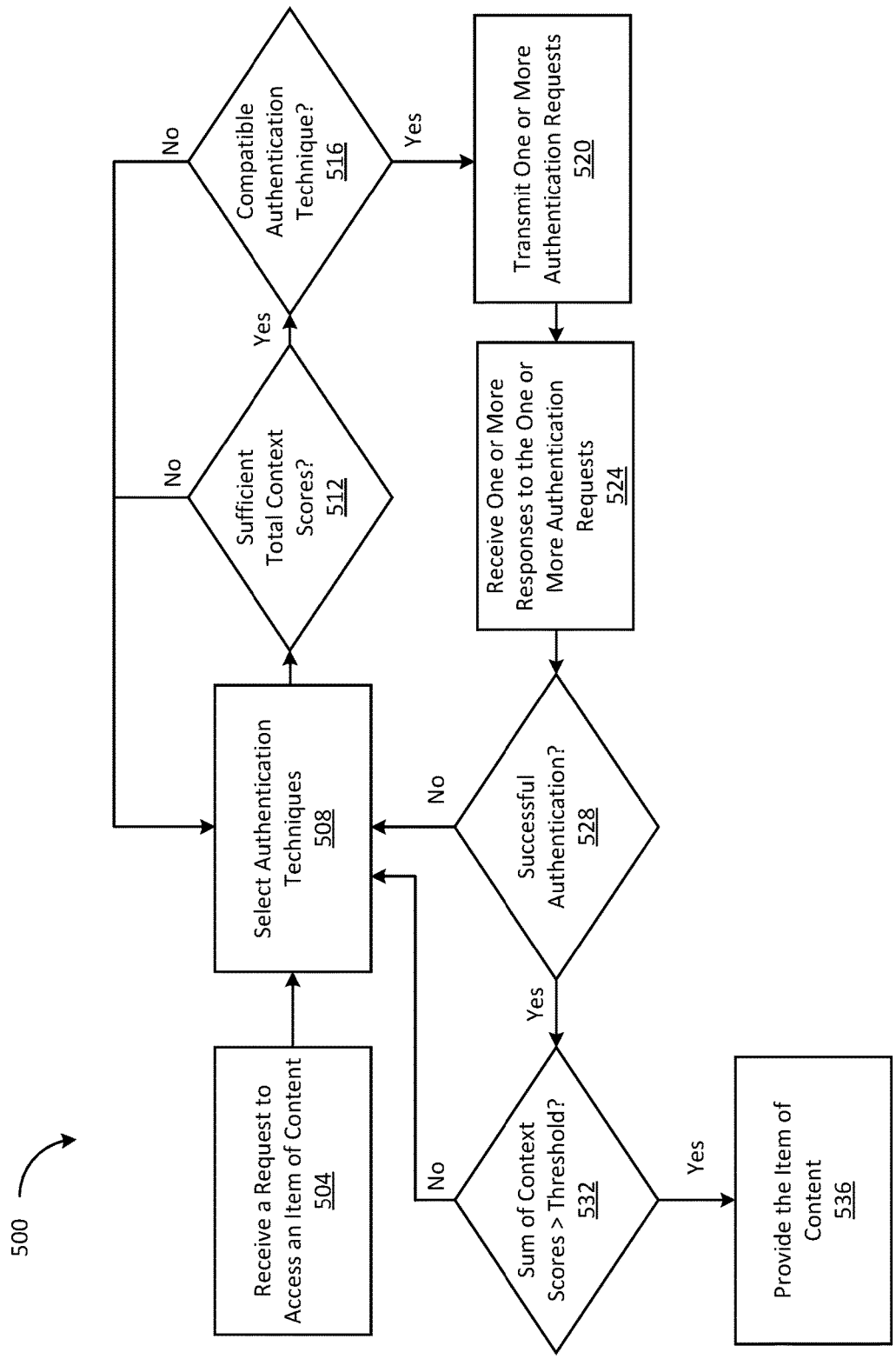
FIG. 5 is a flow chart of an example method for contextual access control, in accordance with an implementation.

Referring to FIG. 5, depicted is a flow chart of one embodiment of a method for contextual confidence scoring-based access control. The functionalities of the method may be implemented using or performed by the components detailed herein in connection with FIGS. 1-4. In brief overview, a computing device can receive a request to access an item of content (504). The computing device can select one or more authentication techniques (508). The computing device can determine if the total context scores of the one or more authentication techniques are sufficient (512). The computing device can determine the compatibility of the one or more authentication techniques (516) based on hardware context or information of the client device. The computing device can transmit one or more authentication requests (520). The computing device can receive one or more responses to the one or more authentication requests (524). The computing device can determine either a successful or unsuccessful authentication (528). The computing device can determine if the sum of context scores is greater than a score threshold (532). The computing device can provide or otherwise grant access to the item of content (536).

Referring now to operation (504), and in some embodiments, a computing device can receive, via a network interface in communication with a client device, a request from the client device to access an item of content. The request for the item of content can include contextual factors including device location data, network connection data, and hardware component data associated with the client device. The device location data can indicate the location of the client device and the location of the user using, for example, a client mobile device (e.g., or any other devices that can be carried by the user). The computing device can use the contextual factor to determine at least a risk level of the client device, compatible one or more authentication techniques, context score associated with the one or more authentication techniques, and score threshold of the client device.

The computing device can compare the location data, the network connection data, and the hardware component data to a historical data table. The computing device can compare the aforementioned responsive to receiving the request to access the item of content. The historical data table can include at least one data set including a location identifier, a network connection identifier, and a hardware component identifier having access to the item of content. The historical data table can store historical information from the client device, such as usage frequency of an authentication technique, list of locations visited by the client device, list of context score associated with the client device location, client location, network context, and other context factors, and indications of successful or unsuccessful authentication by the client device. The computing device can perform the comparison to determine how frequent the client device, when accessing the item of content, 1) is at the location, 2) is connected to the network connection, and 3) utilize the one or more authentication techniques. The location identifier, the network connection identifier, or the hardware component identifier can refer to a previous occurrence of at least one of the context factors during access to the item of content by the client device.

The computing device can decrease the score threshold in response to a match between the location data and the location identifier, a match between the network connection data and the network connection identifier, or a match between the hardware component data and the hardware component identifier. By decreasing the score threshold, the computing device can utilize fewer authentication techniques or utilize one or more authentication techniques with less context score. The computing device can increase the score threshold in response to the location data do not match the location identifier, the network connection data do not match the network connection identifier, or the hardware component data do not match the hardware component identifier. By increasing the score threshold, the computing device may select an additional authentication technique, select one or more authentication techniques with high context score, or replace at least one authentication technique utilized in the authentication request with another authentication technique to satisfy the score threshold.

In some implementations, the computing device can increase the context score of at least one of the authentication technique in response to the location data corresponding to the location identifier, the network connection data corresponding to the network connection identifier, or the hardware component data corresponding to the hardware component identifier. In some implementations, the computing device can decrease the context score associated with the at least one of the authentication techniques in response to the location data not corresponding to the location identifier, the network connection data not corresponding to the network connection identifier, or the hardware component data not corresponding to the hardware component identifier. The location identifier, the network connection identifier, and the hardware component identifier (e.g., authentication technique utilized) can refer to historical or previous location, network connection, or authentication techniques recorded when accessing the item of content. Corresponding the two information above can refer to comparing or matching the present and historical information to determine the risk level of the client device. The computing device can adjust the context score of at least one of authentication technique based on the risk level.

Referring now to operation (508), and in some embodiments, the computing device can select one or more authentication techniques to allow access to the item of content responsive to receiving the request. The computing device can select the authentication techniques from an authentication list or a pool of authentication techniques. The authentication techniques can be associated with or otherwise assigned to a context score determined by an analytics service of the computing device. The computing device can determine context scores based on the contextual factor, the context state, historical data, or other risk factors associated with the client device.

The one or more authentication techniques can include at least one of biometric identification, an email identification, a code comparison, a geolocation comparison, or a notification confirmation associated with access to the item of content and authentication data from the client device indicating authentication techniques supported by the client device. The biometric identification can include FingerprintID or FaceID. The email identification can include an automated generated link in an email for client interaction for authentication. The email identification can redirect the client device to a different webpage, for example. The code comparison can include multi-factor authentication ("MFA") or nFactor authentication including a generated code. The computing device can transmit the generated code to a second device. To authentication, the client device can enter the code transmitted to the second device. The geolocation can include a comparison between the client device location and the location on the map to determine whether the location can be recognized (e.g., office, home, school, etc.). The geolocation comparison can include comparing the client device location to the client location indicated by the location of at least a mobile device, a client tablet, or a client smart wearable items (e.g., smartwatch, smart ring, etc.). The notification confirmation can be a push notification requesting the client to interact with the client device for authentication.

The computing device can assign the context score to the one or more authentication techniques using an associated security level hashed from a lookup table. The lookup table can include security level data of the one or more authentication techniques. The security level data can refer to how secure a authentication technique is. For example, pattern recognition may be less secure than a 4-digit passcode. Therefore, the context score of pattern recognition can be lower than the 4-digit passcode authentication technique. In another example, the passcode can be associated with a lower context score than a password due to a minimum required characters, letters, and unique characters. The computing device can assign the context score to all authentication techniques in a similar manner, based on a comparison of the security level (e.g., risk level) score of the authentication techniques. The security level score can measure the strength of authentication techniques to prevent forgery or duplication.

In some implementations, the client device can consult, responsive to selecting one or more authentication techniques, a historical authentication table including a selection count of authentication techniques to access the item of content. The selection count can refer to the number of times an authentication technique is utilized in an authentication request transmitted from the server to the client device. The client device can compare a selection rate of an authentication technique to a selection rate threshold using the selection count of authentication techniques from the historical authentication table. The client device can increase the context score of an authentication technique in response to the selection rate of the authentication technique exceeding the selection rate threshold. By exceeding the selection rate threshold, the computing device can determine that the same operator is more likely to utilize the authentication technique. Therefore, the computing device can increase the context score of the authentication technique to reduce the effort for the same operator to access the item of content using the same authentication technique. Furthermore, the aforementioned can reduce resource consumption at the server by reducing the operations to provide access to a verified operator.

Referring now to operation (512), and in some embodiments, the computing device can determine whether the total context scores of the one or more authentication techniques are sufficient. The total context scores can refer to a sum of individual context scores of authentication techniques selected by the computing device for utilization in one or more authentication requests. If the total context scores is sufficient, the computing device can proceed to operation (516). If the total context scores is not sufficient, the computing device can select additional authentication technique or replace at least one of the selected authentication technique.

For example, the computing device can select a first authentication technique including a context score of 0.50. If the score threshold is 0.80, the computing device can determine that the total context score is not sufficient. Therefore, the computing device can select a second authentication technique. The second authentication technique can include a context score of 0.30 or above. Otherwise, the computing device can select a third authentication technique with additional context score, etc. In another example, the computing device may have selected two authentication techniques with 0.50 and 0.29 context scores. If the score threshold is 0.80, the client device may replace the first authentication technique with 0.50 with a third authentication technique including a 0.51 context score or greater, or replace the second authentication technique with a third authentication technique including a 0.30 context score or greater.

Referring now to operation (516), and in some embodiments, the computing device can determine the compatibility of an authentication technique with the client device. The operation to determine the compatibility of authentication techniques may be performed during the authentication technique selection process, e.g., operation (508). For example, the computing device can receive the hardware context of the client device indicating compatible authentication techniques. The computing device can proceed to operation (520) if all selected authentication techniques are compatible. The computing device can revert to operation (508) to replace any incompatible authentication techniques.

Referring now to operation (520), and in some embodiments, the computing device can transmit, to the client device via the network interface, one or more authentication requests utilizing the selected one or more authentication techniques. The computing device can transmit the request in response to selecting the one or more authentication techniques. The one or more authentication techniques can be presented to the client device in succession. For example, the computing device can present a first authentication technique to the client device. The computing device can present a second authentication technique in response to receiving a response to the first authentication request from the client device. The first authentication request and the second authentication request can utilize the first authentication technique and the second authentication technique, respectively.

In some implementations, prior to transmitting the one or more authentication requests to the client device, the computing device can transmit an interface component including one or more authentication techniques for selection. The computing device can present the authentication techniques in a list, such as an authentication list. The context score may be presented on the client device. The context score may not be presented on the client device. The computing device can receive an indication of selection of the one or more authentication techniques from the client device via the interface component. In response to receiving the indication of selection of the one or more authentication techniques, the computing device can transmit the one or more authentication requests utilizing the one or more selected authentication techniques to the client device. The computing device can transmit an indication of the selection to the analytics service, for example, to update a context score of the selected authentication techniques in response to either successful or unsuccessful authentication. For example, the context score of selected authentication techniques can increase in response to successful authentication. The context score of a selected authentication technique can decrease in response to unsuccessful authentication.

In some implementations, if the client device selects the MFA or nFactor authentication technique, the computing device can determine a second device associated with the MFA authentication technique. The second device can be represented by an identifier for accessing the item of content, such as an email account, phone number, or device hardware identifier. The identifier of the second device can be linked to the item of content, for example, during sign-up, subscription, or initial access to the item of content. The computing device can transmit, responsive to determining the second device, one or more authentication identifiers utilizing the one or more of authentication techniques, such as the MFA authentication, to the second device. For example, in the case of MFA authentication, the computing device can transmit a first authentication request to the client device. The computing device can transmit a second authentication request to the second device in response to receiving a successful response to the first authentication request from the first device. The computing device can then receive a second response to the second authentication request from the first device using, for example, a one-time code generated and sent to the second device. In some implementations, in response to successful responses to authentication request, the computing device can update the authentication list or table by increasing the context score associated with successfully authenticated authentication techniques.

In some implementations, the computing device can transmit an interface with an interactive element indicating a remember device request to the client device, as in FIG. 2. For example, the computing device can receive a request from the client device to remember the client device in response to an interaction with an element of a user interface (e.g., a remember device interactive element). If the client device successfully verifies the client identity, the computing device may provide access to the client device without transmitting an additional authentication request based on the context state. For example, the client device may request to remember the client device during a context factor having a recorded location and a network connection, such as home, office, or school. In this case, the computing device can provide access to the item of content to the client device upon request for the item of content during a context factor of a known location and network connection. The context factor can be recorded in the historical data storage to indicate one or more "remember device" locations and network connections, for example.

Referring now to operation (524), and in some embodiments, the computing device can receive, from the client device, one or more responses to the one or more authentication requests. The one or more responses can be received in succession. For example, with multiple authentication techniques, the computing device can receive a first response to a first authentication request transmitted to the client device. The computing device can transmit the second authentication request subsequent to receiving the first response. The computing device can then receive a second response to the second authentication request. With a third authentication request, a similar process can be performed. In some implementations, the computing device can receive multiple authentication responses concurrently. For example, the computing device can transmit multiple authentication requests to the client device to be performed simultaneously, such as password authentication, email authentication, anti-bot verification, and push notification. Responsive to transmitting providing all the authentication responses, the computing device can receive the authentication responses to determine one or more successful authentication.

In some implementation, and for example, the computing device can utilize an MFA or nFactor authentication technique. The computing device can determine, responsive to selecting the one or more authentication techniques, such as the MFA, a second device associated with the one or more authentication requests to authenticate the request from the client device. The computing device can receive, from the client device, one or more responses to the one or more authentication requests utilizing the one or more authentication identifiers. In this case, the computing device can receive at least two authentication responses in succession.

Referring now to operation (528), and in some embodiments, the one or more authentication responses can include an indication of successful or unsuccessful authentication for authentication techniques utilized in can authentication request. For example, for a password authentication technique, the computing device can compare the authentication response from the client device to a password stored in the server associated with the access to the item of content for the operator. The computing device can determine either a match or a mismatch between the two elements. The data associated with correct inputs for authentication techniques may be stored at the server. By comparing the inputs from the client device (e.g., one or more authentication responses), the computing device can compare the inputs to the authentication data in the server. In one example, if an authentication response indicates a successful authentication, the computing device can sum the context scores associated with the one or more authentication techniques successfully authenticated. In another example, if at least one of the authentication response indicates an unsuccessful authentication, the computing device can select an additional authentication technique at operation (508). In some implementations, responsive to an indication of successful or unsuccessful authentication, the computing device can transmit the indication to the analytics service to update the authentication list corresponding to the client device, such as increasing or decreasing the context score of an authentication technique. In response to a context score of an authentication technique below a context score threshold, the analytics service can remove the authentication technique from the list, for example, until changes in the context or the context score satisfy the context score threshold.

In some implementations, the computing device can identify, responsive to receiving the one or more authentication responses, a first set of one or more authentication techniques having the indication of successful authentication and a second set of one or more authentication techniques having an indication of unsuccessful authentication. The computing device can increase the context score of authentication techniques in the first set indicating successful authentication in response to identifying the first set and the second set. The computing device can decrease the context score of authentication techniques in the second set indicating unsuccessful authentication in response to identifying the first set and the second set.

Referring now to operation (532), and in some embodiments, the computing device can compare the sum of the context scores of each authentication technique having an indication of successful authentication in the one or more responses to a score threshold. The score threshold may be predetermined or otherwise configurable by an administrator of the computing device. The computing device can configure or manage the score threshold, for example, based on risk level, security level, contextual factors, context state, historical data, or other information related to the security of the client device.

In some implementations, the computing device can determine that the sum of the context scores do not satisfy the score threshold. In this example, the computing device can revert to operation (508) to transmit, responsive to the sum of the context scores not satisfying the score threshold, an additional authentication request utilizing another authentication technique from the pool of authentication techniques. The client device can determine or select the authentication technique from the pool of authentication techniques. The additional authentication technique can be associated with a context score that, upon successful authentication, can provide a sum or greater than or equal to the score threshold, thereby satisfying the score threshold. In response to selecting the authentication technique, the computing device can receive, from the client device, a response to the additional authentication request. The response can include an indication of successful authentication. The computing device can compare a second sum, including the sum of the context scores and the additional context score, to the score threshold. In some implementations, the computing device can provide one or more indications of successful or unsuccessful authentication, additional authentication technique utilized in the additional authentication request, context factor, context state, and other information related to the client device successful or unsuccessful authentication, such as location, network connection, the time for the client to authenticate successfully, or the number of attempts to authenticate the one or more authentication techniques.

Referring now to operation (536), and in some embodiments, the computing device can provide, responsive to the sum of the context scores exceeding the score threshold, the item of content to the client device to improve authentication security. To satisfy the score threshold, the sum of context may be equal to the score threshold. Thus, by utilizing at least these operations, the computing device can improve the authentication security for at least the client and the client device.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

Figure 6:
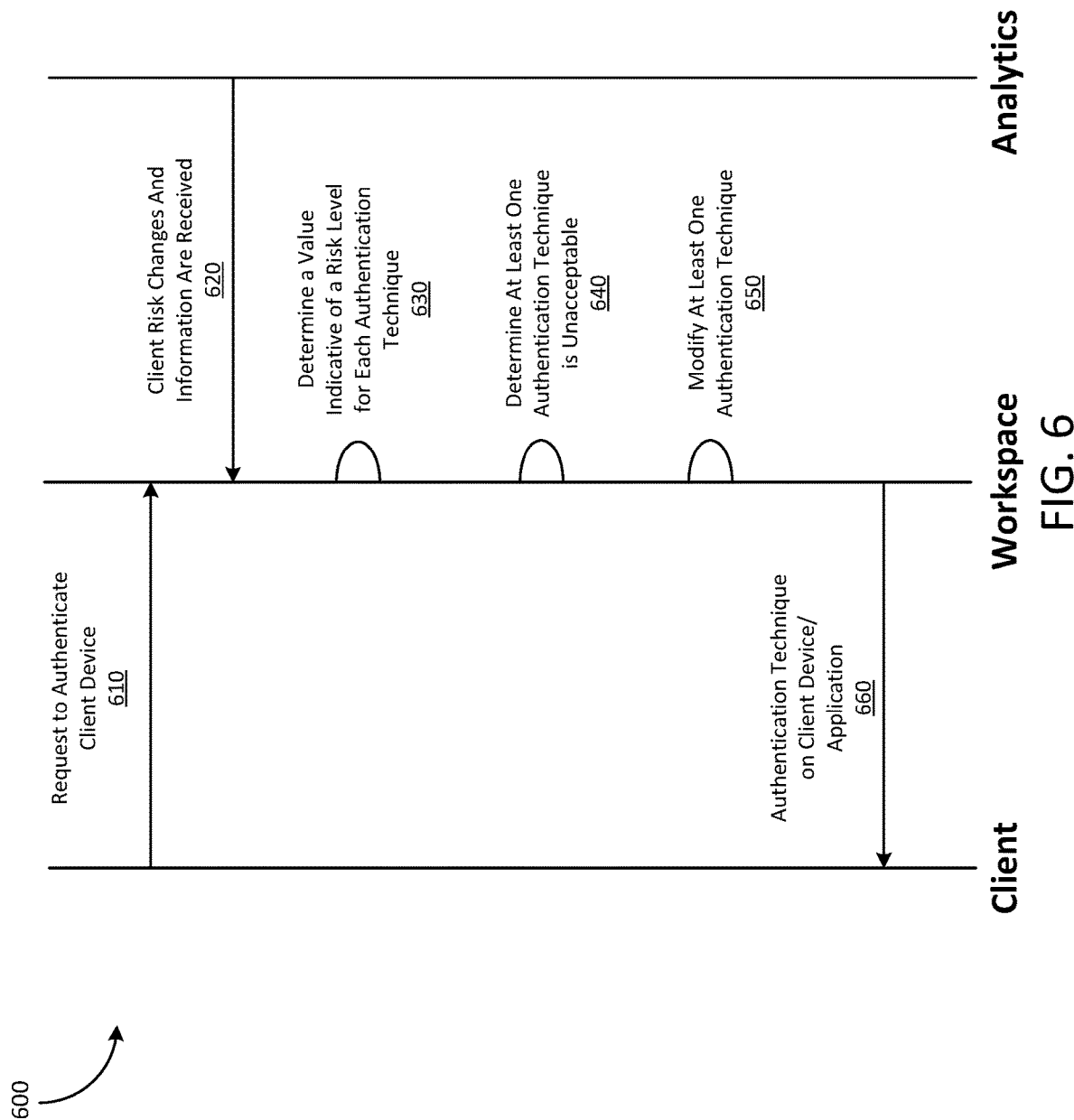
FIG. 6 is a signal flow diagram of an example method for modifying an authentication technique, in accordance with an implementation.

Referring to FIG. 6, depicted is a signal flow diagram 600 of one embodiment of a method for modifying an authentication technique. The functionalities of the method may be implemented using or performed by the components detailed herein in connection with FIGS. 1-5. The features and functionalities of the method can be performed similarly to at least FIG. 4 and FIG. 5. The method of signal flow diagram 600 can be performed or operated by at least a client (e.g., client device), a workspace (e.g., workspace platform), and analytics (e.g., analytics service). The workspace and the analytics can be components of a server. The operations herein can be performed by a computing device or one or more components of a server. At operation 610, the workspace can receive a request from the client device to authenticate the client device. The request can include an indication of one or more authentication techniques executable by the client device and the computing device (e.g., server). Authentication techniques executable by the client device and the computing device can refer to authentication techniques supported by both the client device and the server. For example, the server can identify authentication techniques stored in at least one memory to determine whether the server supports one or more authentication techniques. The server can determine, based on the hardware context of the client device, whether the client device includes hardware or software components to support one or more authentication techniques. At operation 620, the workspace can receive client risk changes and information from the analytics. The analytics can determine risk changes based on the contextual factors of the client. Operations 610 and 620 can perform similar features as operations 410 and 420, respectively, as shown in FIG. 4.

At operation 630, the workspace can determine, for each authentication technique, a value (e.g., score, context score, or context value) indicative of a risk level for the computing device attributable to the authentication techniques for utilization by the client device. The indication of the risk level from the client device can be provided to the computing device, for example, based on contextual factors or a contextual state of the client device. Attributable to the authentication techniques can refer to the value being utilized to determine the identity or authenticity of the client. Based on the contextual factors (e.g., client device location, user location, a network connection) and the context state (e.g., matches between client device location and user location, between historically recorded locations and the client device location, and other combinations of contextual factors), the workspace can determine a risk level associated with an authentication technique. From determining the risk level of the client device, the workspace can configure the context score for an authentication technique accordingly. For example, configuring the context score can include increasing the context score if the client device is located at a registered "home" location, the client device is within the proximity of the user location (e.g., within 50 feet, 25 feet, 10 feet, etc.), or the client device is connected to a verified network connection, such as home network connection which may require the client to authenticate prior to performing operation 610.

At operation 640, the workspace can determine that at least one authentication technique is unacceptable. The at least one authentication technique may be unacceptable for utilization by the client device based on a comparison between the values associated with the one or more of authentication techniques and a threshold (e.g., score threshold or context score threshold). For example, the workspace can retrieve a pool of authentication techniques supported by the client device to select for utilization. The workspace can select, for example, a first authentication technique and a second authentication technique for authenticating the client device identity. In some implementations, the selection of the authentication techniques can be based on user selection, frequency of utilization, context scores, or random selection. The workspace can evaluate the context scores of the selected authentication techniques and compare the sum of the scores with the threshold. The threshold can be predetermined by the server based on the risk level. The server may increase the threshold in response to a high risk level determination, or decrease the threshold in response to a low risk level determination. For example, if the sum of the scores is lower than the threshold, the workspace may proceed to modify either the first authentication technique or the second authentication technique. In another example, if the sum of the scores is equal to or greater than the threshold, the workspace may proceed to operation 660.

At operation 650, the workspace can modify at least one authentication technique in response to the determination that the at least one authentication technique is unacceptable for utilization, to reduce the risk of unauthorized access to a resource. Modifying the authentication technique can refer to increasing the security level of the authentication technique. By increasing the security level, the value of the authentication technique can increase. For example, the authentication request may (1) require multiple fingerprints instead of one for the fingerprint ID; (2) require 180 degrees view of the facial structure for FaceID, instead of a steady image; or (3) request additional verification code for multi-factor authentication. The modification can include sending an additional authentication request to the client device. In some implementations, the modification can temporarily configure the authentication technique for authentication (e.g., one-time configuration of the authentication technique). The modified authentication technique can be utilized in a single authentication request.

In some implementations, and referring to the above example, the workspace can determine to modify either the first authentication technique or the second authentication technique based on various factors. For example, the workspace can determine to modify the authentication technique based on the value (e.g., context score). The value of an authentication technique can depict its security level. If the threshold is 100 and the value includes 60 for the first authentication technique and 30 for the second authentication technique, the workspace may select the second authentication technique for modification. In some cases, the workspace may modify the authentication technique with a higher value, such as the first authentication technique in this example. In another example, the workspace can determine which of the authentication techniques to modify based on the frequency of use. If the first authentication technique was historically utilized 50 times and the second authentication technique was utilized 20 times, the workspace may modify the second authentication technique due to a lower utilization rate, or vice versa.

In some implementations, the workspace can modify the authentication technique by identifying an additional authentication technique associated with a second value acceptable for utilization by the client device. The acceptability of the second value can be based on a comparison between the threshold and a sum of the values of the authentication techniques and the second value. The workspace can select the additional authentication technique for utilization by the client device as a replacement for the at least one authentication technique. For example, and referring to the above example, the selected authentication technique (e.g., third authentication technique), can be in addition to the first authentication technique and the second authentication technique. In another example, the third authentication technique can replace either the first authentication technique or the second authentication technique. If the third authentication technique includes a value of 50, the workspace can replace the second authentication technique with a value of 30. Therefore, the sum of the values (e.g., first and third techniques) can be 110, which exceeds the threshold.

At operation 660, the workspace can transmit one or more authentication techniques acceptable for utilization to the client device (e.g., the workspace application executing on the client device). The acceptability of the authentication techniques can be based on whether the sum of the values of the one or more authentication techniques satisfies or exceed the threshold. Thereafter, the workspace can receive authentication done by the client, evaluate the confidence score, provide access to the item of content to the client device, and provide information related to the authentication process to the analytics. Operation 660 can be performed similarly to operation 440, and the operations thereafter can be shown in FIG. 4.

Referring to FIG. 7, depicted is an example illustration 700 of devices at different locations, in accordance with an implementation. The features and functionalities may be implemented using or performed by the components detailed herein in connection with FIGS. 1-6. The example illustration 700 can include a first device 710, a second device 720, and a third device 730. The first device 710, the second device 720, and the third device 730 can be located at location A, location B, and location C, respectively. The difference between the locations of each device can impact the context score of the authentication techniques utilized on the respective device. For example, the first device 710 (e.g., a mobile device) may indicate a user located at home (e.g., location A) and the second device 720 may indicate the device requesting access to a resource requiring user authentication, where the second device 720 may be located at the office (e.g., location B). Location A and location B may be recorded in a database indicating verified locations for the user to access the resource. The resource may have historically been accessed by the second device 720 having a context state of location A for the first device 710 and location B for the second device 730. Since the second device 720 is accessing the resource in a verified location with the pre-recorded context state, a computing device (e.g., server 202) may increase context scores for the authentication techniques or decrease the score threshold accordingly.

In view of the multi-factor or n-Factor authentication technique examples, the locations may not have been recorded in the database. In this case, the computing device may transmit a multi-factor authentication request to the second device 720 having the illustrated context state. The context state may indicate location B exceeding a predetermined distance from the location A (e.g., 1 mile, 5 miles, or 10 miles), for example. The computing device can transmit a verification code to the first device 710 for utilization by the second device 720. If the second device 720 responded to the authentication request successfully with the verification code, the computing device can record the context state as verified. Thereafter, the computing device can utilize different authentication techniques when verifying the second device 720 having the same context state of the user at location A and the second device 720 at location B.

In some implementations, the computing device can determine a zone in which the user is likely to access the resource. For example, location A and location B can indicate locations where the user may have provided successful authentications and receive access to the resource from the computing device. In this example, the computing device may record a zone around location A and location B indicative of potential locations where the user may access the resource. Accordingly, the computing device may increase the context scores of the authentication techniques or decrease the score threshold based on the device location located within the zone. In some implementations, the computing device can receive location information of each device based on the network connection information, such as home network connection, office network connection, or Free Public WiFi network connection. In some cases, the device requesting access to the resource may not be able to authenticate via multi-factor authentication. In this case, the device may request one or more alternative authentication requests utilizing different one or more authentication techniques.

In some implementations, the third device 730 may request access to the resource at location C. Location C may refer to a public space outside of the zone (e.g., locations where the user typically requests access to the resource). For example, the third device 730 may be connected to the network 203 via LTE or public WiFi. The computing device may receive location information and network connection information of the third device 730 and determine a high risk level for the access request. Responsive to determining the risk level, the computing device can adjust the context scores and the score threshold for the third device 730 (e.g., decreasing the context score for one or more selected authentication techniques or increasing the score threshold). The computing device can transmit authentication requests to the third device 730. The third device 730 can provide responses to the authentication requests indicative of successful or unsuccessful authentication. In further example, if the response indicates successful authentication, the computing device can provide the resource to the third device 730 including a time-out period (e.g., remove from the session or exit resource after user idle for 5 minutes, 10 minutes, etc.). If the response indicates unsuccessful authentication (e.g., after 1, 3, or 5 attempts), the computing device may restrict access to the resource for the third device 730. The computing device can transmit an email or notification alerting the account owner or administrator of the resource of the unsuccessful attempts. To remove the restriction, the user can access an email account of the resource, for example, to confirm or block the attempts by the third device 730. By blocking the attempts, the computing device may request a password or authentication technique change from the user.

FIG. 8A is a block diagram of an example system 800 in which one or more resource management services 802 may manage and streamline access by one or more clients 201 to one or more resource feeds 806 (via one or more gateway services 808) and/or one or more software-as-a-service (SaaS) applications 810. In particular, the resource management service(s) 802 may employ an identity provider 812 to authenticate the identity of a user of a client 201 and, following authentication, identify one of more resources the user is authorized to access. In response to the user selecting one of the identified resources, the resource management service(s) 802 may send appropriate access credentials to the requesting client 201, and the client 201 may then use those credentials to access the selected resource. For the resource feed(s) 806, the client 201 may use the supplied credentials to access the selected resource via a gateway service 808. For the SaaS application(s) 810, the client 201 may use the credentials to access the selected application directly.

The client(s) 201 may be any type of computing devices capable of accessing the resource feed(s) 806 and/or the SaaS application(s) 810, and may, for example, include a variety of desktop or laptop computers, smartphones, tablets, etc. The resource feed(s) 806 may include any of numerous resource types and may be provided from any of numerous locations. In some embodiments, for example, the resource feed(s) 806 may include one or more systems or services for providing virtual applications and/or desktops to the client(s) 201, one or more file repositories and/or file sharing systems, one or more secure browser services, one or more access control services for the SaaS applications 810, one or more management services for local applications on the client(s) 201, one or more internet enabled devices or sensors, etc. Each of the resource management service(s) 802, the resource feed(s) 806, the gateway service(s) 808, the SaaS application(s) 810, and the identity provider 812 may be located within an on-premises data center of an organization for which the system 800 is deployed, within one or more cloud computing environments, or elsewhere.

FIG. 8B is a block diagram showing an example implementation of the system 800 shown in FIG. 8A in which various resource management services 802 as well as a gateway service 808 are located within a cloud computing environment 814. The cloud computing environment may, for example, include Microsoft Azure Cloud, Amazon Web Services, Google Cloud, or IBM Cloud.

For any of illustrated components (other than the client 201) that are not based within the cloud computing environment 814, cloud connectors (not shown in FIG. 8B) may be used to interface those components with the cloud computing environment 814. Such cloud connectors may, for example, run on Windows Server instances hosted in resource locations and may create a reverse proxy to route traffic between the site(s) and the cloud computing environment 814. In the illustrated example, the cloud-based resource management services 802 include a client interface service 816, an identity service 818, a resource feed service 820, and a single sign-on service 822. As shown, in some embodiments, the client 201 may use a resource access application 824 to communicate with the client interface service 816 as well as to present a user interface on the client 201 that a user 826 can operate to access the resource feed(s) 806 and/or the SaaS application(s) 810. The resource access application 824 may either be installed on the client 201, or may be executed by the client interface service 816 (or elsewhere in the system 800) and accessed using a web browser (not shown in FIG. 8B) on the client 201.

As explained in more detail below, in some embodiments, the resource access application 824 and associated components may provide the user 826 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 824 is launched or otherwise accessed by the user 826, the client interface service 816 may send a sign-on request to the identity service 818. In some embodiments, the identity provider 812 may be located on the premises of the organization for which the system 800 is deployed. The identity provider 812 may, for example, correspond to an on-premises Windows Active Directory. In such embodiments, the identity provider 812 may be connected to the cloud-based identity service 818 using a cloud connector (not shown in FIG. 8B), as described above. Upon receiving a sign-on request, the identity service 818 may cause the resource access application 824 (via the client interface service 816) to prompt the user 826 for the user's authentication credentials (e.g., user-name and password). Upon receiving the user's authentication credentials, the client interface service 816 may pass the credentials along to the identity service 818, and the identity service 818 may, in turn, forward them to the identity provider 812 for authentication, for example, by comparing them against an Active Directory domain. Once the identity service 818 receives confirmation from the identity provider 812 that the user's identity has been properly authenticated, the client interface service 816 may send a request to the resource feed service 820 for a list of subscribed resources for the user 826.

In other embodiments (not illustrated in FIG. 8B), the identity provider 812 may be a cloud-based identity service, such as a Microsoft Azure Active Directory. In such embodiments, upon receiving a sign-on request from the client interface service 816, the identity service 818 may, via the client interface service 816, cause the client 201 to be redirected to the cloud-based identity service to complete an authentication process. The cloud-based identity service may then cause the client 201 to prompt the user 826 to enter the user's authentication credentials. Upon determining the user's identity has been properly authenticated, the cloud-based identity service may send a message to the resource access application 824 indicating the authentication attempt was successful, and the resource access application 824 may then inform the client interface service 816 of the successfully authentication. Once the identity service 818 receives confirmation from the client interface service 816 that the user's identity has been properly authenticated, the client interface service 816 may send a request to the resource feed service 820 for a list of subscribed resources for the user 826.

For each configured resource feed, the resource feed service 820 may request an identity token from the single sign-on service 822. The resource feed service 820 may then pass the feed-specific identity tokens it receives to the points of authentication for the respective resource feeds 806. A resource feed 806 may then respond with a list of resources configured for the respective identity. The resource feed service 820 may then aggregate all items from the different feeds and forward them to the client interface service 816, which may cause the resource access application 824 to present a list of available resources on a user interface of the client 201. The list of available resources may, for example, be presented on the user interface of the client 201 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®), one or more secure browsers, one or more internet enabled devices or sensors, one or more local applications installed on the client 201, and/or one or more SaaS applications 810 to which the user 826 has subscribed. The lists of local applications and the SaaS applications 810 may, for example, be supplied by resource feeds 806 for respective services that manage which such applications are to be made available to the user 826 via the resource access application 824. Examples of SaaS applications 810 that may be managed and accessed as described herein include Microsoft Office 365 applications, SAP SaaS applications, Workday applications, etc.

For resources other than local applications and the SaaS application(s) 810, upon the user 826 selecting one of the listed available resources, the resource access application 824 may cause the client interface service 816 to forward a request for the specified resource to the resource feed service 820. In response to receiving such a request, the resource feed service 820 may request an identity token for the corresponding feed from the single sign-on service 822. The resource feed service 820 may then pass the identity token received from the single sign-on service 822 to the client interface service 816 where a launch ticket for the resource may be generated and sent to the resource access application 824. Upon receiving the launch ticket, the resource access application 824 may initiate a secure session to the gateway service 808 and present the launch ticket. When the gateway service 808 is presented with the launch ticket, it may initiate a secure session to the appropriate resource feed and present the identity token to that feed to seamlessly authenticate the user 826. Once the session initializes, the client 201 may proceed to access the selected resource.

When the user 826 selects a local application, the resource access application 824 may cause the selected local application to launch on the client 201. When the user 826 selects a SaaS application 810, the resource access application 824 may cause the client interface service 816 request a one-time uniform resource locator (URL) from the gateway service 808 as well a preferred browser for use in accessing the SaaS application 810. After the gateway service 808 returns the one-time URL and identifies the preferred browser, the client interface service 816 may pass that information along to the resource access application 824. The client 201 may then launch the identified browser and initiate a connection to the gateway service 808. The gateway service 808 may then request an assertion from the single sign-on service 822. Upon receiving the assertion, the gateway service 808 may cause the identified browser on the client 201 to be redirected to the logon page for identified SaaS application 810 and present the assertion. The SaaS may then contact the gateway service 808 to validate the assertion and authenticate the user 826. Once the user has been authenticated, communication may occur directly between the identified browser and the selected SaaS application 810, thus allowing the user 826 to use the client 201 to access the selected SaaS application 810.

In some embodiments, the preferred browser identified by the gateway service 808 may be a specialized browser embedded in the resource access application 824 (when the resource application is installed on the client 201) or provided by one of the resource feeds 806 (when the resource application 824 is located remotely), e.g., via a secure browser service. In such embodiments, the SaaS applications 810 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 201 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 806) for assessment of its security risk by a web filtering service. For approved URLs, the specialized browser may be permitted to access the link. For suspicious links, however, the web filtering service may have the client interface service 816 send the link to a secure browser service, which may start a new virtual browser session with the client 201, and thus allow the user to access the potentially harmful linked content in a safe environment.

In some embodiments, in addition to or in lieu of providing the user 826 with a list of resources that are available to be accessed individually, as described above, the user 826 may instead be permitted to choose to access a streamlined feed of event notifications and/or available actions that may be taken with respect to events that are automatically detected with respect to one or more of the resources. This streamlined resource activity feed, which may be customized for each user 826, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 201 to notify a user 826 of something that requires the user's attention (e.g., approval of an expense report, new course available for registration, etc.).

FIG. 8C is a block diagram similar to that shown in FIG. 8B but in which the available resources (e.g., SaaS applications, web applications, Windows applications, Linux applications, desktops, file repositories and/or file sharing systems, and other data) are represented by a single box 828 labeled "systems of record," and further in which several different services are included within the resource management services block 802. As explained below, the services shown in FIG. 8C may enable the provision of a streamlined resource activity feed and/or notification process for a client 201. In the example shown, in addition to the client interface service 816 discussed above, the illustrated services include a microapp service 830, a data integration provider service 832, a credential wallet service 834, an active data cache service 836, an analytics service 838, and a notification service 840. In various embodiments, the services shown in FIG. 8C may be employed either in addition to or instead of the different services shown in FIG. 8B.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 824 without having to launch the native application. The system shown in FIG. 8C may, for example, aggregate relevant notifications, tasks, and insights, and thereby give the user 826 a dynamic productivity tool. In some embodiments, the resource activity feed may be intelligently populated by utilizing machine learning and artificial intelligence (AI) algorithms. Further, in some implementations, microapps may be configured within the cloud computing environment 814, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 8C, the systems of record 828 may represent the applications and/or other resources the resource management services 802 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 802, and in particular the data integration provider service 832, may, for example, support REST API, JSON, OData-JSON, and 6ML. As explained in more detail below, the data integration provider service 832 may also write back to the systems of record, for example, using OAuth2 or a service account.

In some embodiments, the microapp service 830 may be a single-tenant service responsible for creating the microapps. The microapp service 830 may send raw events, pulled from the systems of record 828, to the analytics service 838 for processing. The microapp service may, for example, periodically pull active data from the systems of record 828.

In some embodiments, the active data cache service 836 may be single-tenant and may store all configuration information and microapp data. It may, for example, utilize a per-tenant database encryption key and per-tenant database credentials.

In some embodiments, the credential wallet service 834 may store encrypted service credentials for the systems of record 828 and user OAuth2 tokens.

In some embodiments, the data integration provider service 832 may interact with the systems of record 828 to decrypt end-user credentials and write back actions to the systems of record 828 under the identity of the end-user. The write-back actions may, for example, utilize a user's actual account to ensure all actions performed are compliant with data policies of the application or other resource being interacted with.

In some embodiments, the analytics service 838 may process the raw events received from the microapps service 830 to create targeted scored notifications and send such notifications to the notification service 840.

Finally, in some embodiments, the notification service 840 may process any notifications it receives from the analytics service 838. In some implementations, the notification service 840 may store the notifications in a database to be later served in a notification feed. In other embodiments, the notification service 840 may additionally or alternatively send the notifications out immediately to the client 201 as a push notification to the user 826.

In some embodiments, a process for synchronizing with the systems of record 828 and generating notifications may operate as follows. The microapp service 830 may retrieve encrypted service account credentials for the systems of record 828 from the credential wallet service 834 and request a sync with the data integration provider service 832. The data integration provider service 832 may then decrypt the service account credentials and use those credentials to retrieve data from the systems of record 828. The data integration provider service 832 may then stream the retrieved data to the microapp service 830. The microapp service 830 may store the received systems of record data in the active data cache service 836 and also send raw events to the analytics service 838. The analytics service 838 may create targeted scored notifications and send such notifications to the notification service 840. The notification service 840 may store the notifications in a database to be later served in a notification feed and/or may send the notifications out immediately to the client 201 as a push notification to the user 826.

In some embodiments, a process for processing a user-initiated action via a microapp may operate as follows. The client 201 may receive data from the microapp service 830 (via the client interface service 816) to render information corresponding to the microapp. The microapp service 830 may receive data from the active data cache service 836 to support that rendering. The user 826 may invoke an action from the microapp, causing the resource access application 824 to send that action to the microapp service 830 (via the client interface service 816). The microapp service 830 may then retrieve from the credential wallet service 834 an encrypted Oauth2 token for the system of record for which the action is to be invoked, and may send the action to the data integration provider service 832 together with the encrypted Oath2 token. The data integration provider service 832 may then decrypt the Oath2 token and write the action to the appropriate system of record under the identity of the user 826. The data integration provider service 832 may then read back changed data from the written-to system of record and send that changed data to the microapp service 830. The microapp service 832 may then update the active data cache service 836 with the updated data and cause a message to be sent to the resource access application 824 (via the client interface service 816) notifying the user 826 that the action was successfully completed.

In some embodiments, in addition to or in lieu of the functionality described above, the resource management services 802 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 802 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 802 may, for example, parse these requests and respond because they are integrated with multiple systems on the back-end. In some embodiments, users may be able to interact with the virtual assistance through either the resource access application 824 or directly from another resource, such as Microsoft Teams. This feature may allow employees to work efficiently, stay organized, and deliver only the specific information they're looking for.

We claim:

1. A method comprising:
   receiving, by a computing device, a request from the client device to access an item of content;
   selecting, by the computing device, responsive to receiving the request, a first subset of a plurality of authentication techniques associated with access to the item of content by the client device, each of the plurality of authentication techniques associated with a context score;
   determining, by the computing device, that a sum of the context scores of the selected first subset of the plurality of authentication techniques exceeds a score threshold;
   transmitting, by the computing device to the client device, responsive to the determination that the sum of the context scores exceeds the score threshold, one or more authentication requests utilizing the selected first subset of the plurality of authentication techniques;
   receiving, from the client device, one or more responses to the one or more authentication requests comprising, for the first subset of the plurality of authentication techniques, an indication of successful or unsuccessful authentication;
   comparing, by the computing device, a sum of the context scores of the plurality of authentication techniques having an indication of successful authentication in the one or more responses to the score threshold;
   identifying, by the computing device, that the client device has not successfully authenticated, responsive to the sum of the context scores of each of the plurality of authentication techniques having the indication of successful authentication being less than the score threshold;
   identifying, by the computing device, an additional authentication technique based on the additional authentication technique being associated with a context score that when added to the sum of the context scores of the plurality of authentication techniques having the indication of successful authentication exceeds the score threshold;
   selecting, by the computing device, the identified additional authentication technique,
   transmitting, by the computing device to the client device, an additional authentication request utilizing the selected additional authentication technique; and
   providing, by the computing device responsive to successful authentication by the client device, access to the item of content to the client device.

2. The method of claim 1, wherein selecting the first subset of the plurality of authentication techniques further comprises:
   selecting a first authentication technique;
   determining that the context score of the first authentication technique is less than the score threshold; and
   selecting a second authentication technique responsive to the determination that the context score of the first authentication technique is less than the score threshold.

3. The method of claim 1, further comprising:
   receiving, from the client device, one or more responses to the one or more authentication requests comprising, for the plurality of authentication techniques, an indication of successful or unsuccessful authentication;
   comparing, by the computing device, a sum of the context scores of the plurality of authentication techniques having an indication of successful authentication in the one or more responses to the score threshold; and
   identifying, by the computing device, that the client device has successfully authenticated, responsive to the sum of the context scores of the plurality of authentication techniques having the indication of successful authentication exceeding the score threshold.

4. The method of claim 3, wherein the indication of successful authentication comprises a match between a received value and a stored value for at least one authentication technique.

5. The method of claim 3, wherein at least one response comprises an indication of unsuccessful authentication, and wherein the sum of the context scores of the plurality of authentication techniques having an indication of successful authentication in the one or more responses is less than the sum of the context scores of the selected first subset of the plurality of authentication techniques.

6. The method of claim 1, further comprising increasing the context score of a first authentication technique of the plurality of authentication techniques responsive to an historical rate of successful authentication with the client device using the first authentication technique exceeding a threshold.

7. The method of claim 1, further comprising decreasing the context score of a first authentication technique of the plurality of authentication techniques responsive to an historical rate of successful authentication with the client device using the first authentication technique being less than a threshold.

8. A system comprising:
   a computing device comprising one or more processors and a network interface in communication with a client device;
   wherein the one or more processors are configured to:
      receive a request from the client device to access an item of content,
      select, responsive to receiving the request, a first subset of a plurality of authentication techniques associated with access to the item of content by the client device, each of the plurality of authentication techniques associated with a context score, determine that a sum of the context scores of the selected first subset of the plurality of authentication techniques exceeds a score threshold, transmit, to the client device, responsive to the determination that the sum of the context scores exceeds the score threshold, one or more authentication requests utilizing the selected first subset of the plurality of authentication techniques, receive, from the client device, one or more responses to the one or more authentication requests comprising, for the first subset of the plurality of authentication techniques, an indication of successful or unsuccessful authentication;

compare a sum of the context scores of the plurality of authentication techniques having an indication of successful authentication in the one or more responses to the score threshold;

identify that the client device has not successfully authenticated, responsive to the sum of the context scores of each of the plurality of authentication techniques having the indication of successful authentication being less than the score threshold;

identify an additional authentication technique based on the additional authentication technique being associated with a context score that when added to the sum of the context scores of the plurality of authentication techniques having the indication of successful authentication exceeds the score threshold;

select the identified additional authentication technique, transmit, to the client device, an additional authentication request utilizing the selected additional authentication technique, and provide, responsive to successful authentication by the client device, access to the item of content to the client device.

9. The system of claim 8, wherein the one or more processors are further configured to:

select a first authentication technique;

determine that the context score of the first authentication technique is less than the score threshold; and select a second authentication technique responsive to the determination that the context score of the first authentication technique is less than the score threshold.

10. The system of claim 8, wherein the one or more processors are further configured to:

receive, from the client device, one or more responses to the one or more authentication requests comprising, for the plurality of authentication techniques, an indication of successful or unsuccessful authentication;

compare a sum of the context scores of the plurality of authentication techniques having an indication of successful authentication in the one or more responses to the score threshold; and identify that the client device has successfully authenticated, responsive to the sum of the context scores of the plurality of authentication techniques having the indication of successful authentication exceeding the score threshold.

11. The system of claim 10, wherein the indication of successful authentication comprises a match between a received value and a stored value for at least one authentication technique.

12. The system of claim 10, wherein at least one response comprises an indication of unsuccessful authentication, and wherein the sum of the context scores of the plurality of authentication techniques having an indication of successful authentication in the one or more responses is less than the sum of the context scores of the selected first subset of the plurality of authentication techniques.

13. The system of claim 8, wherein the one or more processors are further configured to increase the context score of a first authentication technique of the plurality of authentication techniques responsive to an historical rate of successful authentication with the client device using the first authentication technique exceeding a threshold.

14. The system of claim 8, wherein the one or more processors are further configured to decrease the context score of a first authentication technique of the plurality of authentication techniques responsive to an historical rate of successful authentication with the client device using the first authentication technique being less than a threshold.

* * * * *